United States Patent
Konno et al.

(10) Patent No.: US 8,856,457 B2
(45) Date of Patent: Oct. 7, 2014

(54) INFORMATION PROCESSING SYSTEM AND A SYSTEM CONTROLLER

(71) Applicant: Fujitsu Limited, Kawasaki (JP)

(72) Inventors: Yuuji Konno, Yokohama (JP); Hiroshi Murakami, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 13/686,171

(22) Filed: Nov. 27, 2012

(65) Prior Publication Data

US 2013/0086331 A1   Apr. 4, 2013

Related U.S. Application Data

(63) Continuation of application No. PCT/JP2010/058971, filed on May 27, 2010.

(51) Int. Cl.
*G06F 13/00*   (2006.01)
*G06F 12/08*   (2006.01)
*G06F 13/16*   (2006.01)

(52) U.S. Cl.
CPC ........ *G06F 12/0828* (2013.01); *G06F 12/0806* (2013.01); *G06F 12/0846* (2013.01); *G06F 13/1689* (2013.01); *G06F 13/1694* (2013.01); *G06F 12/0815* (2013.01); *G06F 12/0855* (2013.01)
USPC ........... 711/146; 711/119; 711/120; 711/145; 710/33; 710/54; 709/232; 709/233; 712/14; 712/248

(58) Field of Classification Search
CPC ............ G06F 12/0806; G06F 12/0815; G06F 12/0846; G06F 13/1689; G06F 13/1694

USPC .......... 711/119, 120, 145, 146; 709/232, 233; 710/33, 54; 712/14, 248
See application file for complete search history.

(56) References Cited

U.S. PATENT DOCUMENTS

| 6,292,870 | B1 | 9/2001 | Ishizuka et al. |
| 2006/0053255 | A1 | 3/2006 | Sugizaki |
| 2006/0080506 | A1* | 4/2006 | Rajamony et al. ............ 711/119 |
| 2007/0083717 | A1* | 4/2007 | Rajamony et al. ............ 711/141 |

(Continued)

FOREIGN PATENT DOCUMENTS

| JP | 11-73370 | 3/1999 |
| JP | 2000-132531 | 5/2000 |

(Continued)

OTHER PUBLICATIONS

Kalokerinos et al., FPGA Implementation of a Configurable Cache/Scratchpat Memory with Virtualized User-Level RDMA Capability, 2009, IEEE, pp. 149-156.*

(Continued)

*Primary Examiner* — Reba I Elmore
(74) *Attorney, Agent, or Firm* — Staas & Halsey LLP

(57) ABSTRACT

In a system including a plurality of CPU units having a cache memory of different capacity each other and a system controller that connects to the plurality of CPUs and controls cache synchronization, the system controller includes a cache synchronization unit which monitors an address contention between a preceding request and a subsequent request and a setting unit which sets different monitoring range of the contention between the preceding request and the subsequent request for each capacity of the cache memory in each of the CPU units.

18 Claims, 16 Drawing Sheets

(56) References Cited

U.S. PATENT DOCUMENTS

| | | |
|---|---|---|
| 2008/0313411 A1 | 12/2008 | Sugizaki |
| 2008/0320238 A1 | 12/2008 | Sugizaki |
| 2011/0185128 A1 | 7/2011 | Ukai et al. |

FOREIGN PATENT DOCUMENTS

| | | |
|---|---|---|
| JP | 2006-79218 | 3/2006 |
| JP | 2008-123333 | 5/2008 |
| JP | 4335298 | 7/2009 |
| WO | 2007/099583 A1 | 9/2007 |
| WO | 2010/038301 A1 | 4/2010 |

OTHER PUBLICATIONS

International Search Report of PCT/JP2010/058971 mailed Sep. 7, 2010.

* cited by examiner

| INDEX: PA[18:8] | STATUS STS[7:0] | REGISTRATION ADDRESS PA[41:19] | PHYSICAL ADDRESS OF MAIN MEMORY | |
|---|---|---|---|---|
| * 00000000000 | | | A0 | B0 |
| * 00000000001 | | | A1 | B1 |
| * 00000000010 | | | A2 | B2 |
| ............ | ......... | ............ | ... | ... |
| ............ | ......... | ............ | ... | ... |
| * 11111111111 | | | A2047 | B2047 |

FIG. 6

| INDEX: PA[18:8] | STATUS STS[7:0] | REGISTRATION ADDRESS PA[41:19] | PHYSICAL ADDRESS OF MAIN MEMORY |
|---|---|---|---|
| * 00000000000 | | | A0 |
| * 00000000001 | | | A1 |
| * 00000000010 | | | A2 |
| ............ | ......... | ............ | ... |
| ............ | ......... | ............ | ... |
| * 11111111111 | | | A2047 |
| | | | |
| * 00000000000 | | | B0 |
| * 00000000001 | | | B1 |
| * 00000000010 | | | B2 |
| ............ | ......... | ............ | ... |
| ............ | ......... | ............ | ... |
| * 11111111111 | | | B2047 |

INFORMATION PROCESSING SYSTEM AND A SYSTEM CONTROLLER

CROSS-REFERENCE TO RELATED APPLICATION

This application is a continuation application of International Application PCT/JP2010/058971 filed on May 27, 2010 and designated the U.S., the entire contents of which are incorporated herein by reference.

FIELD

The embodiments discussed herein are related to information processing system and a system controller.

BACKGROUND

Parallel processing is effective to improve the processing speed of the information processing system. In parallel processing system, a plurality of processing units (CPU: Central Processing Unit) share the process. In addition, in order to improve the processing speed of the CPU, a cache memory) is provided between the CPU and a main memory. The cache memory holds data, its address and status of which the CPU would access among the data stored in the main memory, and is configured of a high-speed and a small-capacity memory. The cache memory executes an input and output of the data behalf of the main memory of which the CPU originally accesses.

Because the cache memory automatically stores the data and performs an alternative operation of the main memory, program of the CPU is no need to be aware of the cache memory. In recent years, according to an improvement of integration of LSI (Large Scale Integrated) and an increase in the demand speed of the device, the cache memory is provided in the CPU chip.

In SMP (Symmetric Multi-Processing) system among the parallel processing system, one CPU performs a snoop to search contents which are registered in the cache memory of the other CPU. To prevent interference of the cache memory which is caused the snoop between the CPUs, synchronization mechanism of the cache memory of the CPU is provided.

When processing consecutive requests to the same cache address, the synchronization mechanism of the cache memory retries a subsequent request which arrives before an update of the cache management information on an preceding request is not completed. This control is referred to as busy control. The SMP system has set a uniform monitoring range of the busy to all CPU chips.

RELATED ART

[Patent Document 1] Japanese Laid-Open Patent Publication No. 2008-123333.

The CPU chip of which the capacity of the cache memory has been increased are provided for improving of the CPU performance. And it is effective to add new CPU chip in order to improve the performance of existing information processing system. For example, a CPU chip having a larger capacity of the cache memory is added to the existing system which is composed of a CPU chip having a smaller capacity of the cache memory. Or a CPU chip having a smaller capacity of the cache memory is added to the existing system which is composed of a CPU chip having a larger capacity of the cache memory. In this way, there is a high need of the technology in the system operation to reduce unnecessary costs by adding a CPU chip required for processing.

In a case of adding the CPU chip later to existing information processing system, there is a possibility to mix the CPU chips which has a different capacity of the cache memory. In a SMP environment, a system controller that is connected to the plurality of CPU chips has the cache synchronization mechanism. When connecting the plurality of CPU chips which have the cache memory of different capacity to one system controller, in order to take the integrity of the TAG between the plurality of CPUs, the system controller has set same monitoring range of the busy for the plurality of CPU chips.

However, when the CPU chips with different cache size are mixed in the system, it is fair to draw sufficiently the performance of the CPU having a cache memory of larger capacity, because the monitoring range of the busy in all CPUs is set the value in accordance with the CPU chip having a cache memory of smallest capacity.

SUMMARY

According to an aspect of the embodiments, information processing system includes a first CPU unit having a first CPU and a first cache memory to store cache tag information and cache data, a second CPU unit having a second CPU and a second cache memory that stores cache tag information and cache data and has a different capacity from the capacity of the first cache memory, and a system controller that is connected to the first CPU unit and the second CPU unit and searches a third cache memory that stores a copy of the cache tag information in the first cache memory and a fourth cache memory that stores a copy of the cache tag information in the second cache memory according to a request of the first cache memory and the second cache memory from the first CPU unit and the second CPU unit. The system controller includes a cache synchronization unit that monitors whether or not preceding request and subsequent request requires same cache address by monitoring range of busy that is set and make a retry of the subsequent request that requires the same cache address as the preceding request to a CPU that has required when receiving the subsequent request before completing update of the copy of the cache tag information by the preceding request and a setting unit that sets different monitoring range of the busy between the third cache tag memory and a fourth cache tag memory to the cache synchronization unit.

Further, the system controller that is connected to a first CPU unit having a first CPU and a first cache memory to store cache tag information and cache data and a second CPU unit having a second CPU and a second cache memory that stores cache tag information and cache data and has a different capacity from the capacity of the first cache memory, includes a cache tag search unit that searches a third cache memory that stores a copy of the cache tag information in the first cache memory and a fourth cache memory that stores a copy of the cache tag information in the second cache memory according to a request of the first cache memory and the second cache memory from the first CPU unit and the second CPU unit. a cache synchronization unit that monitors whether or not preceding request and subsequent request requires same cache address by monitoring range of busy that is set and make a retry of the subsequent request that requires the same cache address as the preceding request to a CPU that has required when receiving the subsequent request before completing update of the copy of the cache tag information by the preceding request and a setting unit that sets different monitoring range of the busy between the third cache tag memory and a fourth cache tag memory to the cache synchronization unit.

The object and advantages of the invention will be realized and attained by means of the elements and combinations part particularly pointed out in the claims.

It is to be understood that both the foregoing general description and the following detailed description are exemplary and explanatory and are not restrictive of the invention.

BRIEF DESCRIPTION OF THE DRAWINGS

FIG. 5 is an explanatory diagram of busy monitoring range of the cache memory having a first capacity of the embodiment in FIG. 3;

FIG. 6 is an explanatory diagram of comparative example which is adopted the busy monitoring range in FIG. 5 to a busy monitoring range of a cache memory having a second capacity;

DESCRIPTION OF EMBODIMENTS

Hereinafter, the embodiments will be described in the order of information processing system, a cache synchronization control of the information processing system, a system controller, an address contention check unit, a cache synchronization process, a dynamic cache synchronization process, other embodiments, however, the information processing system and the system controller are not limited to a configuration in these embodiments.

(Information Processing System)

Figure 1:
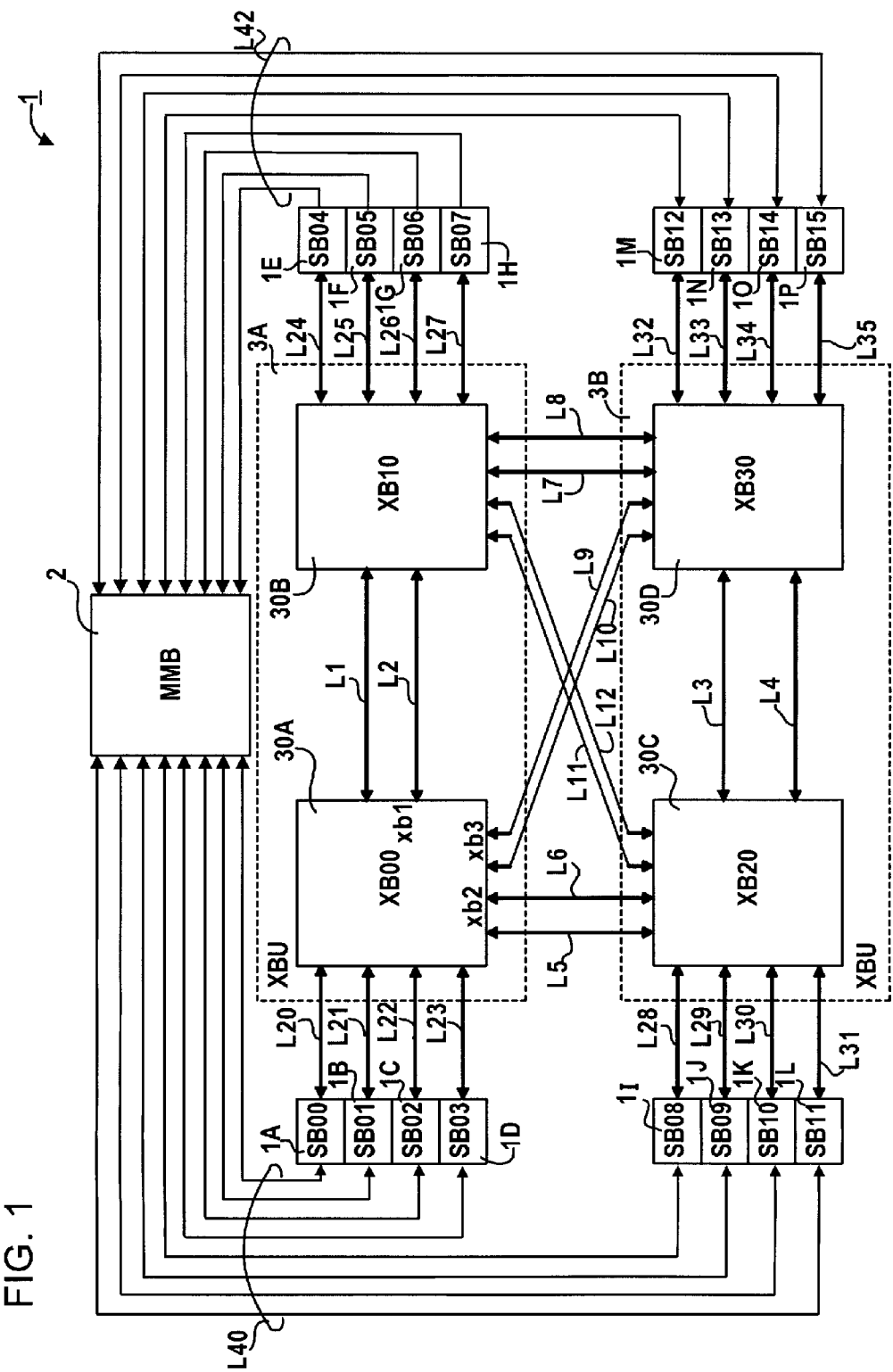
FIG. 1 is a block diagram of information processing system according to an embodiment.
Figure 2:
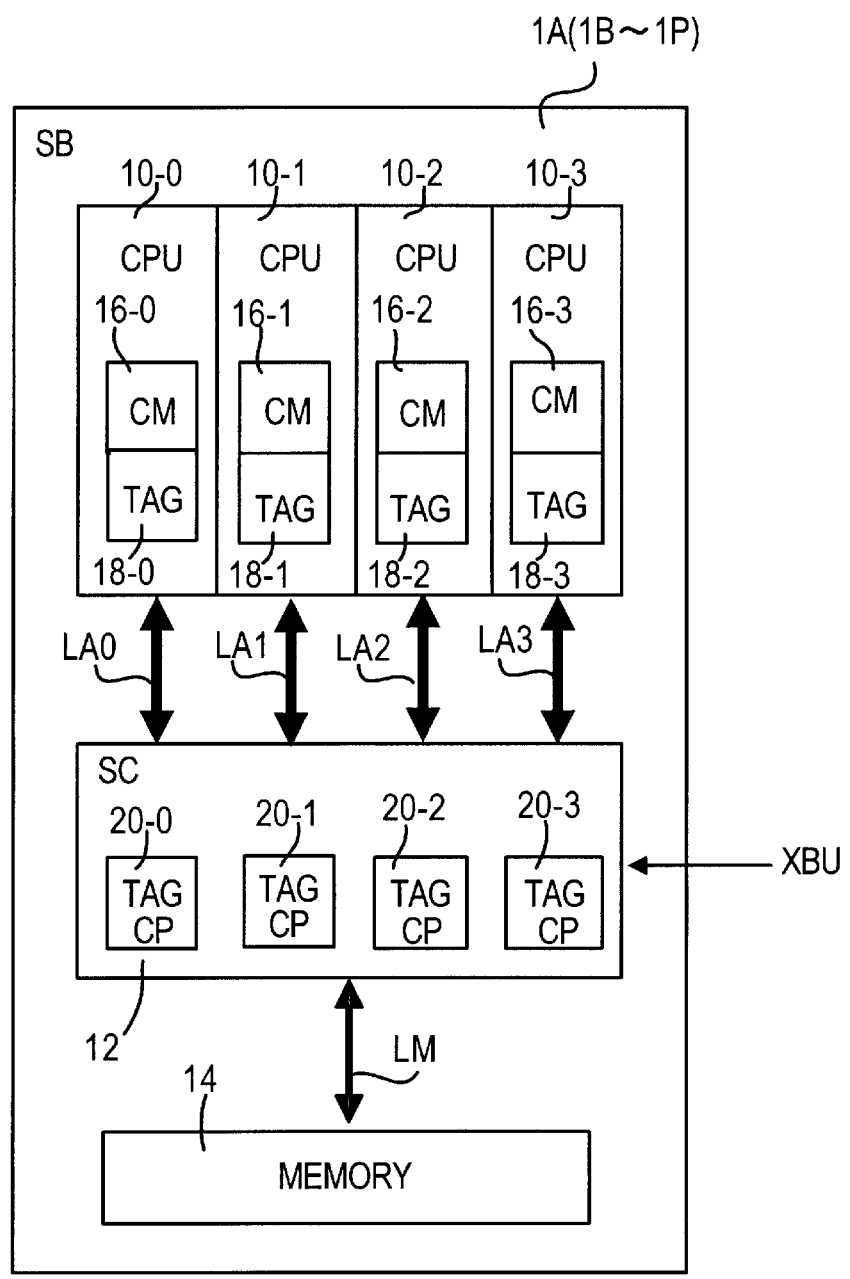
FIG. 2 is a block diagram of a system board in FIG. 1.

FIG. 1 is a block diagram of information processing system according to an embodiment. FIG. 2 is a block diagram of a system board in FIG. 1. The information processing system in FIG. 1 illustrates a server system connected with a computer network. In FIG. 1, the server system 1 includes a plurality of system boards (SB: System Boards) 1A~1P as processing devices, a management board (MMB) 2 as a system controller (SVP: SerVice Processor) and crossbar switches (or switches) 30A~30D.

In the embodiment of FIG. 1, a first switch board 3A mounts a first crossbar switch 30A and a second crossbar switch 30B. And the first crossbar switch 30A connects to the second crossbar switch 30B via buses L1 and L2. Further, a second switch board 3B mounts a third crossbar switch 30C and a fourth crossbar switch 30D. And the third crossbar switch 30C connects to the fourth crossbar switch 30D via buses L3 and L4.

In addition, the first crossbar switch 30A connects to the fourth crossbar switch 30D via buses L9 and L10. And the second crossbar switch 30B connects to the third crossbar switch 30C via buses L11 and L12.

Each of the first, second, third and fourth system boards 1A, 1B, 1C, 1D connect to the first crossbar switch 30A via buses L20, L21, L22 and L23. Each of the fifth, sixth, seventh and eighth system boards 1E, 1F, 1G, 1H connect to the second crossbar switch 30B via buses L24, L25, L26 and L27.

Each of the ninth, tenth, eleventh and twelfth system boards 1I, 1J, 1K, 1L connect to the third crossbar switch 30C via buses L28, L29, L30 and L31. Each of the thirteenth, fourteenth, fifteenth and sixteenth system boards 1M, 1N, 1O, 1P connect to the fourth crossbar switch 30D via buses L32, L33, L34 and L35.

The management board (hereinafter referred to MMB) 2 connects to each of the system boards 1A~1P via internal buses L40 and L42. The MMB 2 monitors the status, sets status, controls start and stop of each system boards 1A~1P.

In FIG. 1, the server system is illustrated by an example of configuration of sixteen unit of the system boards 1A~1P and four unit of crossbar switches 30A~30D. However, the number of the system boards and the number of the crossbar switch are not limited to 16 units and 4 units.

The configuration of the system boards 1A~1P will be explained by using FIG. 2. As illustrated in FIG. 2, each of the system boards 1A (1B~1P) includes a plurality of CPU chips 10-0~10-3 (as described to "CPU" in FIG. 2), the system controller 12 (as described to "SC" in FIG. 2) and a main storage unit (as described to "memory" in FIG. 2). Each of the CPU chips 10-0~10-3 includes a CPU (not shown in FIG. 2), a cache memory (as described to "CM" in FIG. 2) 16-0~16-3 and a cache tag memory (as described to "TAG" in FIG. 2) 18-0~18-3. The cache tag memory (called to CPU cache tag memory) 18-0~18-3 holds cache tag information indicating the status of the cache memory which is mounted on the same CPU chip.

The system controller 12 connects to each of the CPU chips 10-0~10-3 via buses LA0~LA3. And the system controller 12 connects to the main storage unit 14 via a memory bus LM. Further, the system controller 12 connects to the crossbar switch 30A (30B~30D). And the system controller 12 controls the communication interface between the system boards 10-0 to 10-3, controls an access to the main storage unit 14 and controls the communication interface with the other system boards via the crossbar switch. For example, the system controller 12 is composed of a LSI circuit.

The system controller 12 includes a cache tag memory (called to a cache tag memory) 20-0~20-3 to store a copy of the cache tag information which is stored in the cache tag memory 18-0~18-3 of the CPU chips 10-0~10-3. Because the system controller 12 has a copy of the tag in the CPU cache memory, it is possible to realize a high-speed cache access by the snoop operation in the SMP system.

The CPU cache tag memory 18-0~18-3 stores registration address (also referred to as frame address or tag) and cache status. The status of the cache memory is four status of "M" (Modify), "O" (Owner), "S" (Share) and "I" (Invalid). The structure of the cache tag memory is data structure of a set associative scheme. The set associative scheme is data storage structure which is consisted of a plurality of tags and is able to store data in different addresses to same entry. In addition, a part of physical address (PA) is utilized as the address of the cache tag memory 18-0~18-3.

In the embodiment, the example depicts that the system controller 12 is able to connect to up to four CPU chips, but it may be configured to a system that the system controller 12 connect to at least two CPU chips. Although described in the example that the system board 1A (1B~1P) is equipped with four CPU chips, it may be configured to mount at least one CPU chip on the system board 1A.

(Cache Synchronization Control of the Information Processing System)

Figure 3:
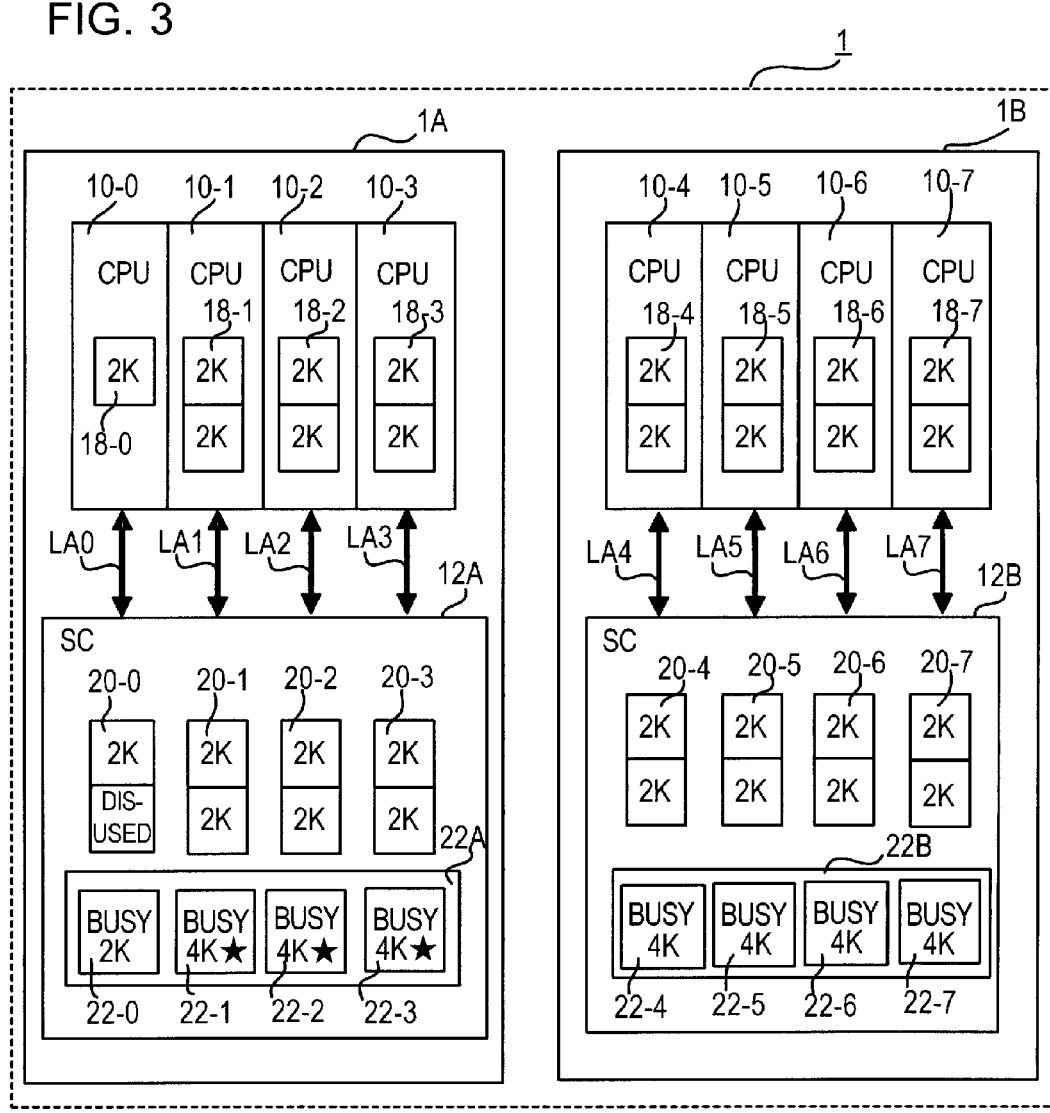
FIG. 3 is a block diagram illustrating an example of the configuration of the system board in FIG. 2.

FIG. 3 is a block diagram illustrating an example of the configuration of the system board in FIG. 2. In FIG. 3, same elements as that illustrated in FIG. 1 and FIG. 2 are indicated by the same symbols. In FIG. 3, the system board 1A includes a plurality of CPU chips 10-0~10-3 and the system controller 12A. The plurality of CPU chips 10-0~10-3 which are connected to the system controller 12A via the buses LA0~LA3 configures computer group (called as domain) that share the same database.

The system board 1B includes a plurality of CPU chips 10-4~10-7 and a system controller 12B. The plurality of CPU chips 10-4~10-7 which are connected to the system controller 12B via the buses LA4~LA7 configures another domain which is different from the domain including the CPU chips 10-0~10-3. In addition, the main storage unit 14 described in FIG. 2 is mounted on each of the system boards 1A and 1B.

The plurality of CPU chips 10-0~10-3 in which capacity of cache memory is different from each other are mounted on the system board 1A. The plurality of CPU chips 10-4~10-7, in which capacity of the cache memory are same, are mounted on the system board 1B. In the embodiment, the CPU chip 10-0 on the system board 1A mounts the cache memory of a first capacity and the CPU chips 10-1~10-3 on the system board 1A mounts the cache memory of the second capacity which has two times of the first capacity.

In accordance with the difference of the capacity of the cache memory, the CPU chip 10-0 includes a CPU cache tag memory 18-0 of a first capacity (for example, 2K-LINE (2000 lines)) and the CPU chips 10-0~10-3 includes a CPU cache tag memory 18-1~18-3 of a second capacity (for example, 4K-LINE (4000 lines)) which is twice of the first capacity.

The system controller 12 includes the SC cache tag memory 20-0~20-3 for each of the CPU chips 10-0~10-3 and a cache synchronization control unit 22.

Each of the SC cache tag memory 20-0~20-3 stores a copy of corresponding CPU cache tag memory 18-0~18-3. The memory capacity of each of SC cache tag memory 20-0~20-3 is equal to 2K+2K (as depicted to "2K, 2K" in FIG. 3).

The SC cache tag memory 20-0 corresponding to the CPU chip 10-0 utilizes half area 2K (for example, 2K-LINE) in the SC cache tag memory 20-0 to the copy area of the CPU cache tag memory 18-0. The SC cache tag memory 20-1~20-3 corresponding to the CPU chips 10-1~10-3 utilize whole area 2K+2K (for example, 4K-LINE) in the SC cache tag memory 20-0 to the copy area of the CPU cache tag memory 18-1~18-3.

The cache synchronization control unit 22A and 22B, when processing consecutive requests which require the same cache address, performs busy control which retries the subsequent request arrived before completing the update of the cache management information (TAG) by an preceding request.

The cache synchronization control unit 22A monitors the busy range of the SC cache tag memory 20-0 within setting value 22-0 of the first range (BUSY2K) and monitors the busy range of the SC cache tag memory 20-1~20-3 within the setting values 22-1~22-3 of the second range (BUSY4K).

In this way, because the system controller 12 sets the monitoring range of busy individually for each of CPU chips, it is possible to improve the performance of the CPU chip in the information processing system which is mixed the CPU chips having the cache memory of different capacity. In particular, it is effective when CPU 10-0 is separated from the CPU 10-1~10-3 by the domain.

Figure 4:
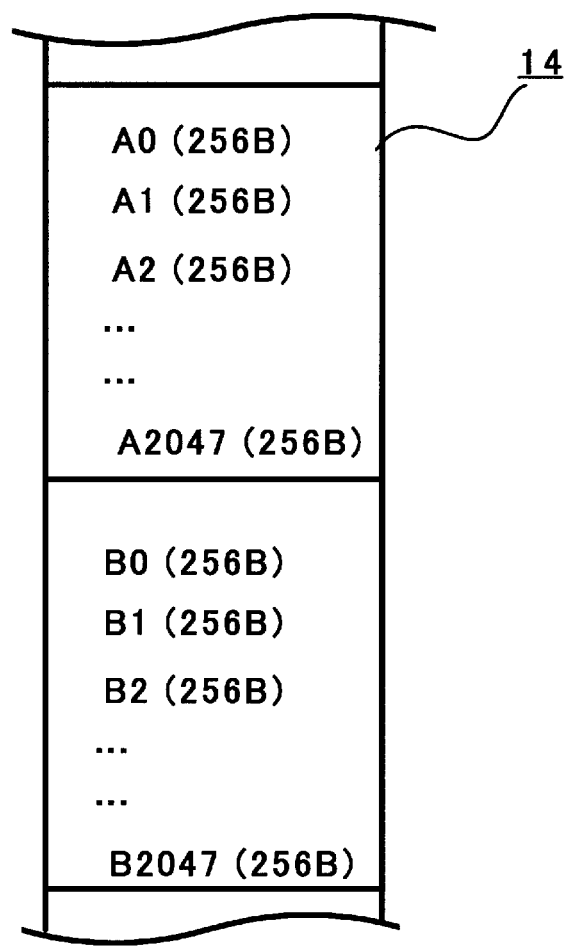
FIG. 4 is an explanatory diagram of memory address of main memory in FIG. 2.

In more detail, the cache busy control in the system controller according to the embodiment will be explained. FIG. 4 is an explanatory diagram of address map in the main storage unit in FIG. 2. The storage area of the main storage unit 14 are allocated to, for example, the physical address A0~A2047 and B0~B2047 in the unit of 256 bytes. In addition, it is assumed that the physical address PA from the CPU is 39 bits [41:3]. Frame address (or tag) is defined by the upper 23 bits [41:19] of the physical address PA [41:8] and the entry address is defined by the lower 11 bits [18:8] of the physical address PA [41:8].

Figure 7:
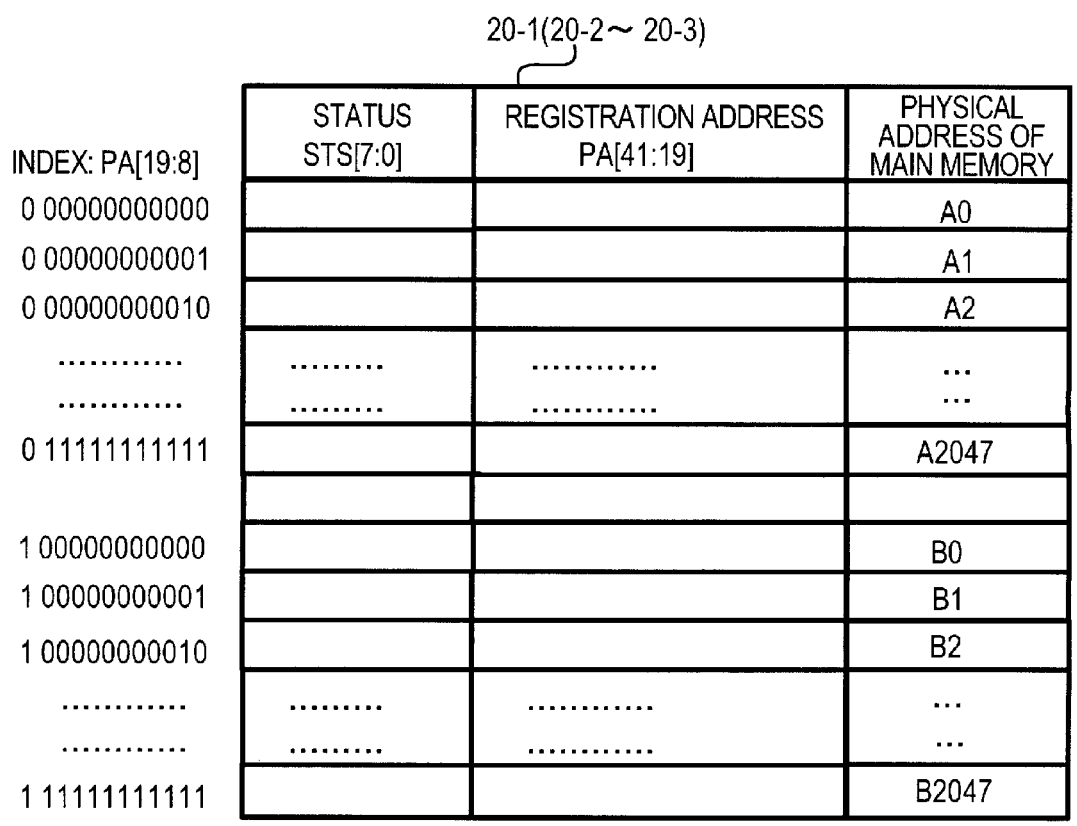
FIG. 7 is an explanatory diagram of busy monitoring operation to the cache memory having a second capacity according to the embodiment in FIG. 3.

As illustrated in FIG. 5 and FIG. 7, the cache tag memory 20-0~20-3 stores a registration address of 23 bits and cache status (STS [7:0]) of 8 bits. The registration address is the upper 23 bits [41:19] of the physical address PA.

Because the structure of the physical address cache tag memory 20-0-20-3 is adopted to the set associative method described above, a part of the physical address (PA) is used as address of the cache tag memory 20-0~20-3 which stores the registration address and the cache status.

FIG. 5 is an explanatory diagram of the SC cache tag memory 20-0 in the CPU chip 10-0 in which the capacity of the cache memory is even according to the embodiment. FIG. 5 depicts the relationship between indexes, status, the registration address and physical address of the main memory. The SC cache tag memory 20-0 is set to 2K-LINE (that is, indicating the registered line to 2000 lines), so 11-bit physical address PA [18:8] is used as the index. Then, the busy monitoring range is set to 11-bit physical address PA [18:8] which is 2K-LINE [18:8].

In this case, because the upper 23 bits of the physical address PA [41:19] are used as the registration address, the registration address of the physical addresses A0 and B0 in the main memory are same. Similarly, the registration address of the physical addresses A1 and B1 in the main memory are same. Therefore, in the cache memory 16-0, when the data of the physical address A0 is locked, the data of the physical address B0 is also locked.

FIG. 6 is an explanatory diagram 20-1~20-3 of the SC cache tag memory 20-1~20-3 in the CPU chips 10-1~10-3 in which the capacity of the cache memory is double when setting the busy to 2K-LINE (registration lines=2000) as same as FIG. 5.

That is, as depicted in FIG. 6, even though the cache capacity has been doubled, the index of the busy control are used the same physical address PA [18:8] which is same as that of which the cache capacity is even. In this case, the registration address PA [41:19] of the physical addresses A0 and B0 are same even though the cache capacity is double, for example, when the data of the physical address A0 has been locked, the data of the physical address B0 is also locked. Therefore, the physical address B0 which is not necessary to lock originally is also busy monitoring target, so the retry process due to unnecessary busy will be occurred and the processing throughput decreases.

FIG. 7 is a diagram of the relationship between indexes, status, the registration address and physical address of the main memory in the SC cache tag memory 20-1~21-3 in which the capacity of the cache memory is double according to the embodiment. The SC cache tag memory 20-1~20-3 is set 4K-LINE (that is, indicating the registration line to 4000 lines), so 12-bit physical address PA [19:8] is used as the index. Then, the busy monitoring range is set to 12-bit physical address PA [19:8] which is 4K-LINE.

Accordingly, the physical address A0 and the physical address B0 are recognized as a separate entry depending on the top bit "19" of the index for the control busy. Therefore, when the physical address A0 is locked, only the physical address A0 is busy, and it is not determined that physical address B0 is busy. Therefore, the setting construction of the busy range as illustrated in FIG. 7, decrease the occurrence of busy, reduce the retry frequency, and improve processing throughput, compared to FIG. 6. The firmware implemented in the MMB2 as depicted in FIG. 1 performs to set the busy range.

Figure 8:
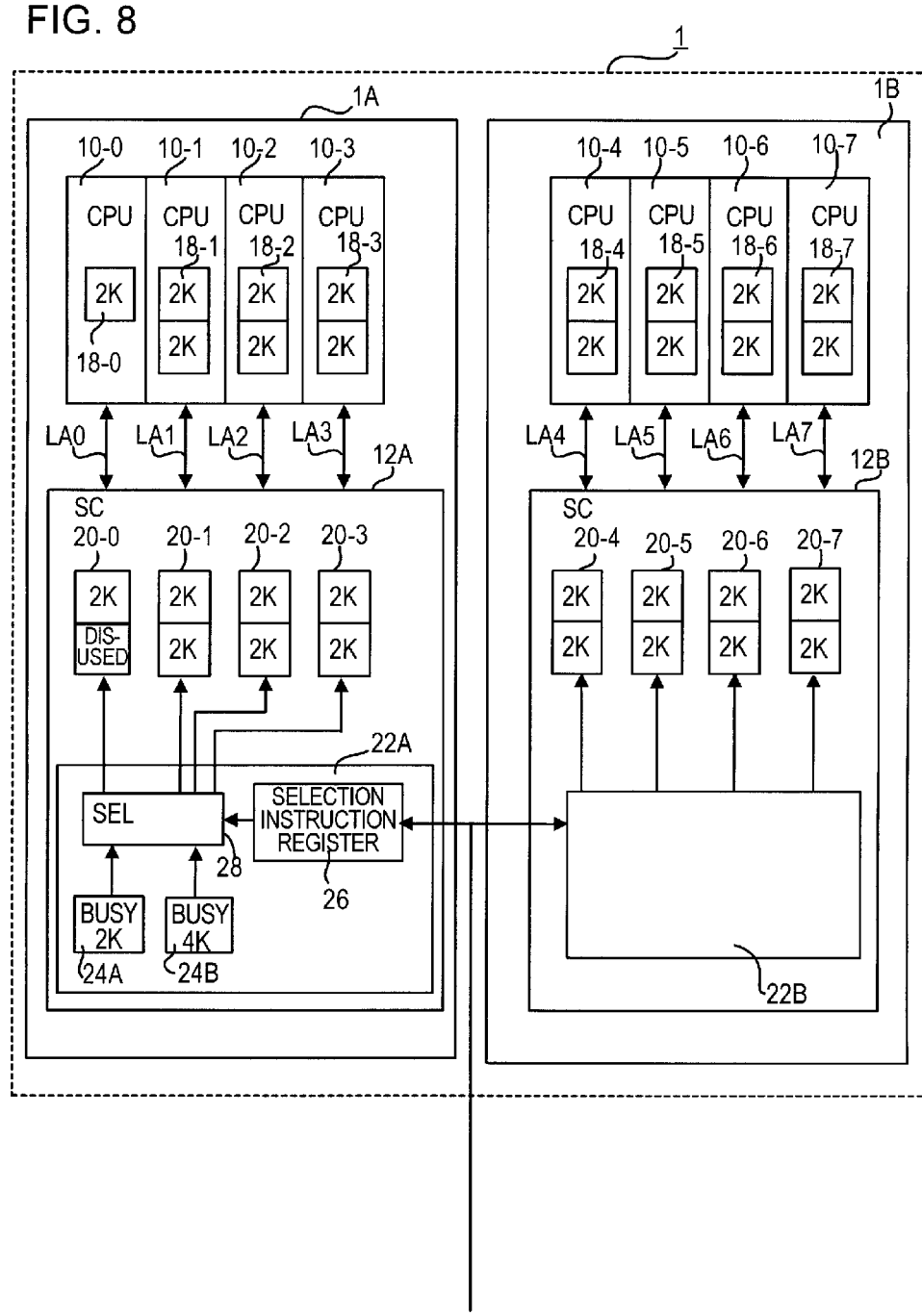
FIG. 8 is a block diagram of another example of the configuration of the system board in FIG. 2.

FIG. 8 is a block diagram illustrating another example of the configuration of the system board in FIG. 2. In FIG. 8, the same elements as those described in FIG. 3 are indicated by the same symbols. As illustrated in FIG. 8, a cache synchronous control unit 22A monitors the busy range of the SC cache tag memory 20-0 by the set value 24A of a first range (BUSY 2K) and monitors the busy range of the SC cache tag memory 20-1~20-3 by the set value 24B of a second range (BUSY 4K).

In this case, the cache synchronization control unit 22A is provided to two setting registers 24A and 24B, a selection circuit 28 and a selection instruction register 26 which holds a selection instruction from the MMB 2, instead of providing the setting registers 22-0~22-3 for each cache tag memory 20-0~20-3. The selection circuit 28 selects either one of the setting registers 24A and 24B according to the selection instruction from the selection instruction register 28 and the selected one is used to monitor the busy range.

Figure 9:
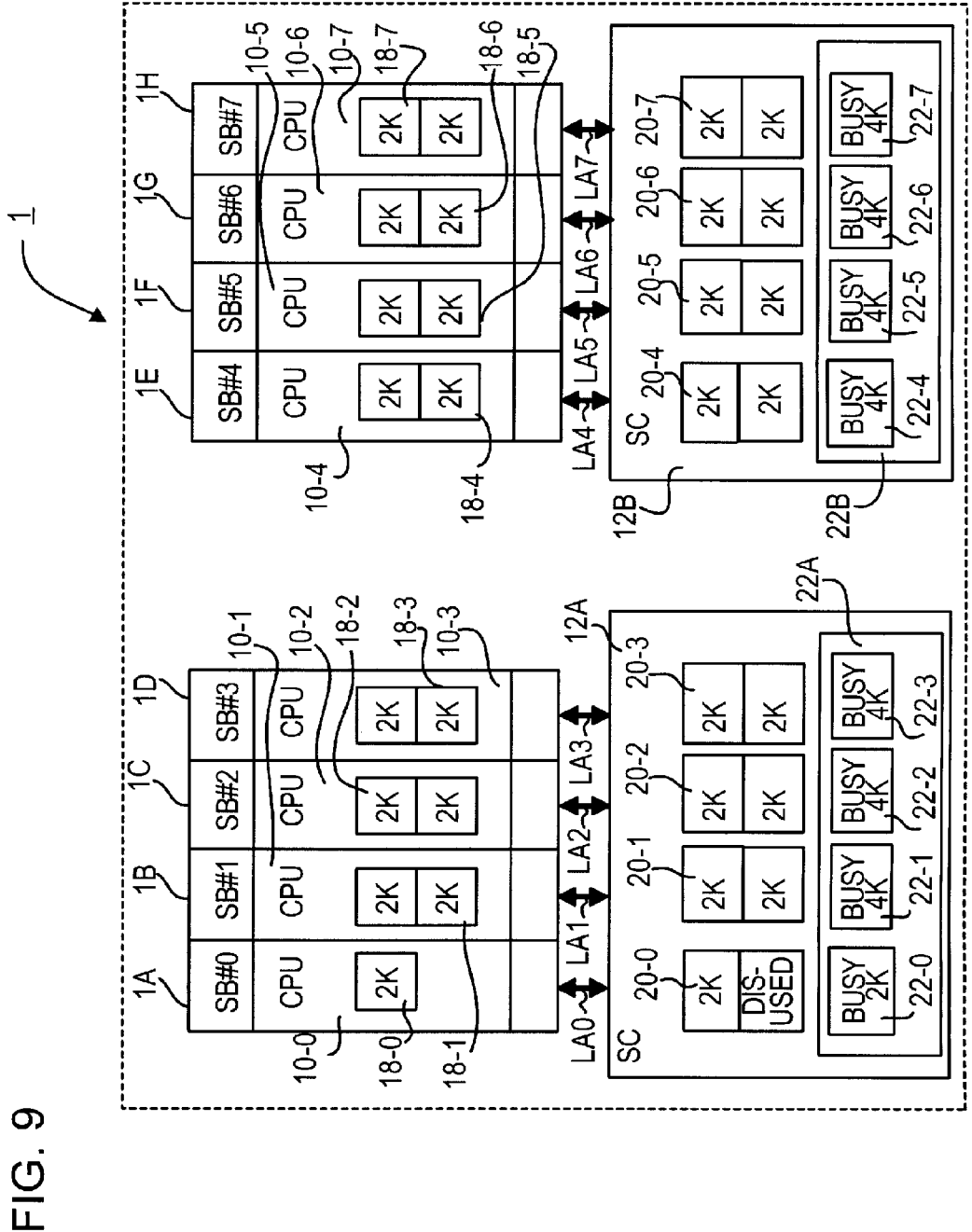
FIG. 9 is a block diagram illustrating another example of the system configuration of FIG. 3.

FIG. 9 is a block diagram illustrating the other example of the system configuration in FIG. 3. In FIG. 9, the same elements as those described in FIG. 3 are indicated by the same symbols. As depicted in FIG. 9, each of the system boards 1A~1H is equipped with a single CPU chip 10-0~10-7. Also in the embodiment, the CPU chip 10-0 on the system board 1A is equipped with the cache memory of the first capacity and the CPU chips 10-1~10-7 on the system boards 1B~1H are equipped with the cache memory of the second capacity which is double of the first capacity.

In accordance with the difference of the capacity of the cache memory, the CPU chip 10-0 includes the CPU cache tag memory 18-0 having a first capacity (for example, 2K-LINE (2000 lines)) and the CPU chip 10-1~10-7 includes the CPU cache tag memory 18-1~18-7 having a second capacity (for example, 4K-LINE (4000 lines)) which is double with the first capacity.

A pair of the system controller 12A and 12B is provides to another board (called to system board) which is provided separately from the system board 1A~1H. The main storage unit is provided to the system boards 12A and 12B. And the system controllers 12A and 12B includes SC cache tag memories 20-0~20-7 for each of the CPU chips 10-0~10-7 and the cache synchronous control unit 22.

Each of the SC cache tag memories 20-0~20-7 stores a copy of the CPU cache tag memory 18-0~18-7. The memory capacity in each of the SC cache tag memory 20-0~20-7 are same. the symbol "2K" in FIG. 9 indicates the memory capacity.

The SC cache tag memory 20-0 corresponding to the CPU chip 10-0 uses half area 2K (for example, 2K-LINE) in the SC cache tag memory 20-0 to the copy area of the CPU cache tag memory 18-0. The SC cache tag memories 20-1~20-7 corresponding to the CPU chips 10-1~10-7 use whole area 2K+2K (for example, 4K-LINE) in the SC cache tag memories 20-1~21-7 to the copy area of the CPU cache tag memories 18-1~18-7.

The cache synchronous control unit 22A monitors the busy range of the SC cache tag memory 20-0 by the set value 22-0 of a first range (BUSY 2K) and monitors the busy range of the SC cache tag memory 20-1~20-3 by the set values 22-1~22-3 of a second range (BUSY 4K).

The cache synchronization control unit 22B monitors the busy range of the SC cache tag memories 20-4~20-7 by the set values of the second range (BUSY4K).

In this way, even in a configuration that the system controllers 12A and 12B are provided outside the system boards 1A~1H and each of the system boards 1A~1H connects to the system controllers 12A and 12B, the busy control in the embodiment can be applied.

(System Controller)

Figure 10:
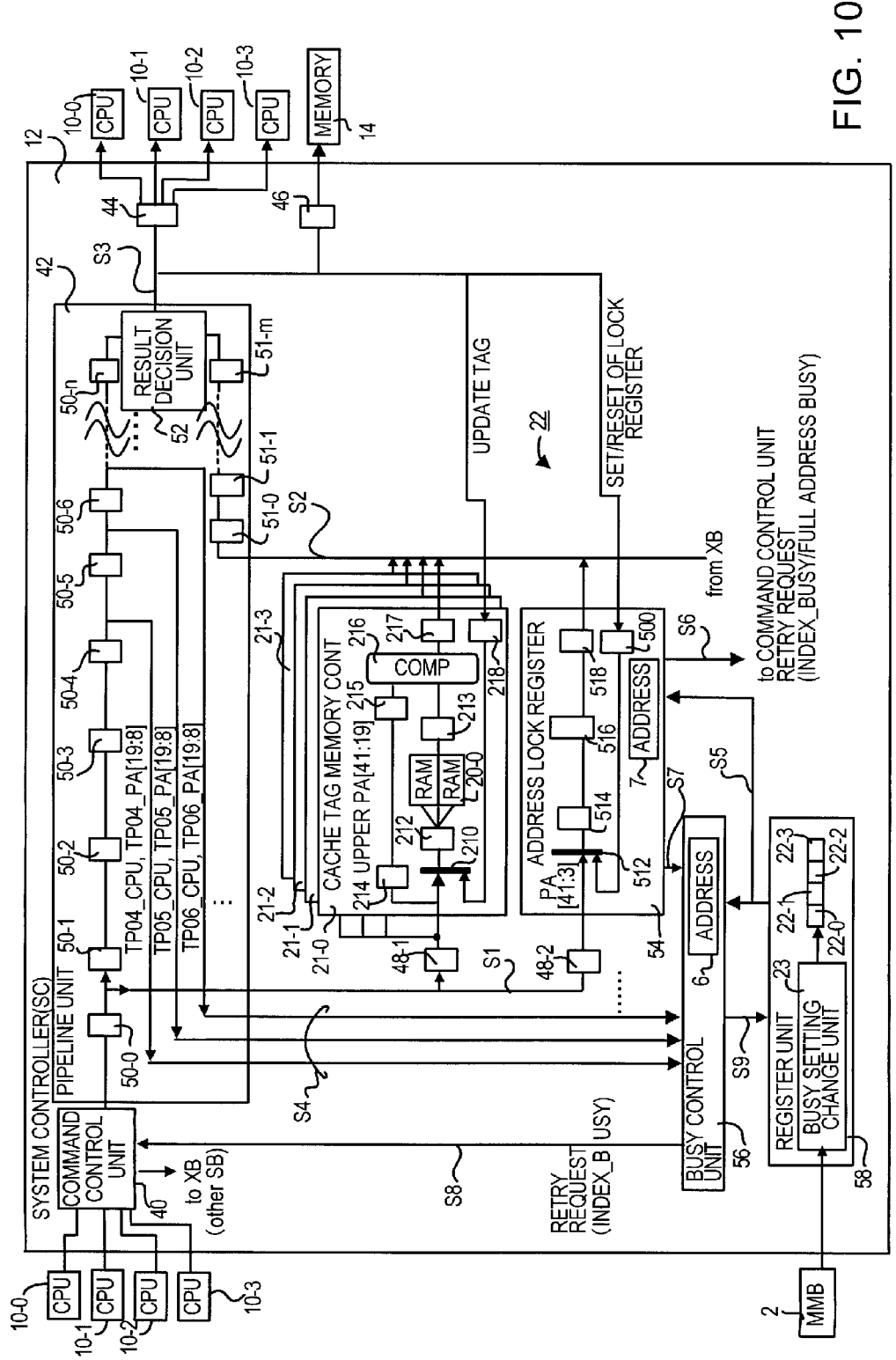
FIG. 10 is a block diagram illustrating a configuration of a system controller according to the embodiment.
Figure 11:
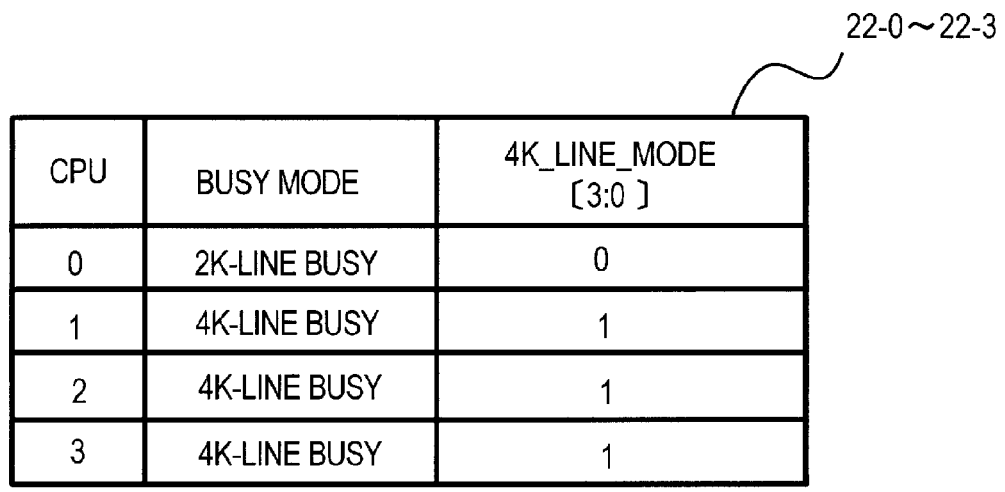
FIG. 11 is a diagram of explanation of busy setting register in a register unit in FIG. 10.

FIG. 10 is a block diagram illustrating a configuration of a system controller according to the embodiment. FIG. 11 is an explanatory diagram of a busy setting register in a register unit in FIG. 10. In FIG. 10, same elements as those described in FIG. 1 to FIG. 4 are indicated with the same symbols.

As depicted in FIG. 10, the system controller 12 includes a command control unit 40, a pipeline unit 42 including a result decision unit 52, a CPU interface unit 44 for each of the CPU chips 10-0~10-3, a memory interface unit 46 for the main storage unit (memory) 14, a cache synchronization mechanism 22, and cache tag memory control units (as described to cache tag memory cont in FIG. 10) 21-0 to 21-3. The cache synchronization mechanism 22 includes a register unit 58, and an address lock register unit 54 (as described to address lock register in FIG. 10) and a busy control unit 56.

The command control unit 40, after stored the command transferred from the CPU of the CPU chips 10-0~10-3 in the command queue, analyzes the destination of the command and outputs the command to the crossbar switch 30A (as referring to FIG. 1) or the pipeline unit 42 according to the destination which were analyzed. In the embodiment, the command is configured in a request packet.

The request packet includes a VAL bit (Valid signal indicating the effectiveness of the request), 39-bit physical address PA [41:3] of the request and a 4-bit CPU number of the request source. The index is a 12-bit [19:08] in one portion of the physical address. In addition, a number of the requesting CPU of the 4-bit (bit 0~3), bit 0=1 indicates a request from the CPU0 (10-0), bit1=1 indicates a request from the CPU1 (10-1), bit2=1 indicates a request from the CPU2 (10-2), and bit3=1 indicates a request from the CPU3 (10-3).

The pipeline unit 42 includes a plurality of series-connected FF (Flip Flop) circuits 50-0~50-$n$, and performs a time adjustment for waiting of search processing of the cache tag memory control unit 21-0~21-3. That is, the FF circuits 50-0~50-$n$ shift the command to the subsequent FF circuits 50-1~50-$n$ for each time TP. The command control unit 40 transfers the command to the pipeline unit 42. The FF circuit 50-0 in the first stage of the pipeline unit 42 receives the command from the command control unit 40. The command in the FF circuit 50-0 in the first stage of the pipeline unit 42 is transferred to the FF circuit 48-1 in the cache tag memory control unit 21-0~21-3 and the FF circuit 48-2 in the address lock register unit 54 via a signal line S1.

The cache tag memory control unit 21-0~21-3 includes SC cache tag memories 20-0~20-3 corresponding to each of the CPU chips 10-0~10-3. In addition, the cache tag memory control unit 20-0~20-3 includes a TAG updating gate 210, a search unit 212 of the cache tag memory 20-0, a FF circuit 213, a FF circuit 214 which holds the upper bits [41:19] of the physical address PA in the command, and a FF circuit 215 for timing adjustment, a comparison circuit (as described to COMP in FIG. 10) 216, an output FF circuit 217, and a FF circuit 218 for updating TAG.

In each of the cache tag memory control unit 21-0~21-3, the search unit 212 receives the command from the FF circuit 48-1 via the TAG updating gate 210. The search unit 212 extracts the index contained in the command and searches the cache tag memory 20-0-20-3 by the index. The search result of the search unit 212 is held in the FF circuit 213.

Also, in the cache tag memory control unit 21-0 to 21-3, the FF circuit 214 holds the upper bits [41:19] of the physical address PA in the FF circuit 48-1, and outputs to the comparison circuit 216 via the timing adjustment FF circuit 215. The comparison circuit 216 compares the search result of the FF circuit 213 with the upper bits PA [41:19] in the FF circuit 215, and outputs a determination result of a cache hit or miss to the output FF circuit 217.

The address lock register unit 54 includes an address lock unit and an address contention check unit (as described to ADDRESS in FIG. 10) 7. The address lock register unit 54 includes a lock register set gate 512, a FF circuit 514, a lock register 516 which holds the physical address of the command, an output FF circuit 518, and a FF circuit 500 FF which holds a lock signal register set/reset signal. In addition, the address contention check unit 7, as detailed in FIG. 13, extracts the index [19:8] and the FULL address [41:3] from the physical address in the command, and performs the address contention check in the busy range that has been notified through the signal line S5 from the register unit 58. Then, the address contention check unit 7, when determined an index busy or a full address busy, outputs a retry request to the command control unit 40 via a signal line S6.

The result decision unit 52 in the pipeline unit 42 receives the cache search result from each of the cache tag control unit 21-0~21-3 and status of the other system board through a signal line S2 and the FF circuits 51-0~51-m for timing adjustment. And the result decision unit 52 decides the transfer destination of the command in the pipeline unit 42 (the FF circuit 50-n of the last stage) from the cache search result from each of the cache tag control unit 21-0~21-3 and status of the other system board and transfers the command to determined destination via the signal line S3.

For example, the result decision unit 52, when the data of the command is present in either one of the cache memories 16-0 to 16-1 of the CPU chips 10-0~10-3, transfer the command to the CPU chips 10-0~10-3 which is present the data of the command through the signal line S3 and the CPU interface unit 44. In addition, the result decision unit 52, when the data of the command does not exist in any cache memory 16-0 to 16-1 of the CPU chips 10-0~10-3, transfers the command to the memory 14 through the signal line S3 and the memory interface unit 46.

Further, the result decision unit 52, when determined the destination of the command, outputs TAG updating signal to the TAG updating FF circuit 218 in each of the cache tag control unit 21-0~21-3 via the signal line S3 and outputs the lock register reset signal to the FF circuit 500 in the address lock register unit 54 through the signal line S3. Each of the cache tag control unit 21-0 to 21-3 allows to input the command in the FF circuit 48-1 to the search unit 212 from the TAG updating gate 210. In addition, the address lock register unit 54 allow to input the command in the FF circuit 48-2 to the lock address register 516 from the address updating gate 512.

The register unit 58 includes a busy setting changing unit 23 and busy setting registers 22-0 to 22-3. The busy setting changing unit 23 sets the setting value of the busy range which has been transferred from the MMB 2 to the busy setting registers 22-0 to 22-3. FIG. 11 illustrates the setting value of the busy range (4K_LINE_MODE) and busy status for each of the CPU 0~3 (10-0~10-3) in the busy setting registers 21-0~21-3. In this example, the busy mode indicates "2K_LINE BUSY" when the 4K_LINE_MODE in the setting value of the busy range is "0", and the busy mode indicates "4K_LINE_BUSY" when the "4K_LINE_MODE" in the setting value of the busy range is "1".

The busy control unit 56 includes an address contention check unit 6 (as described to ADDRESS in FIG. 10). As described below, the address contention check unit 6 performs a contention check of the index PA [19:8] in the command held by each of the FF circuits 50-4~50-n-1 in the pipeline unit 42 that has received via the signal line S4 within the busy range that received from the register unit 58 via a signal line S5. Then, the busy control unit 56, when determined the index busy, outputs a command retry request to the command control unit 40 via the signal line S8 and inputs and suppresses the command that stored in the queue in the command control unit 40 to the pipeline unit 42.

In the embodiment, in order to perform a dynamic change control for the busy range described later, the address lock status in the address lock register 54 is notified to the busy control unit 56 via a signal line S7. In addition, a setting enable notification of the busy range is notified to the register unit 58 from the busy control unit 56 by a signal line S9.

(Address Contention Check Unit)

Figure 12:
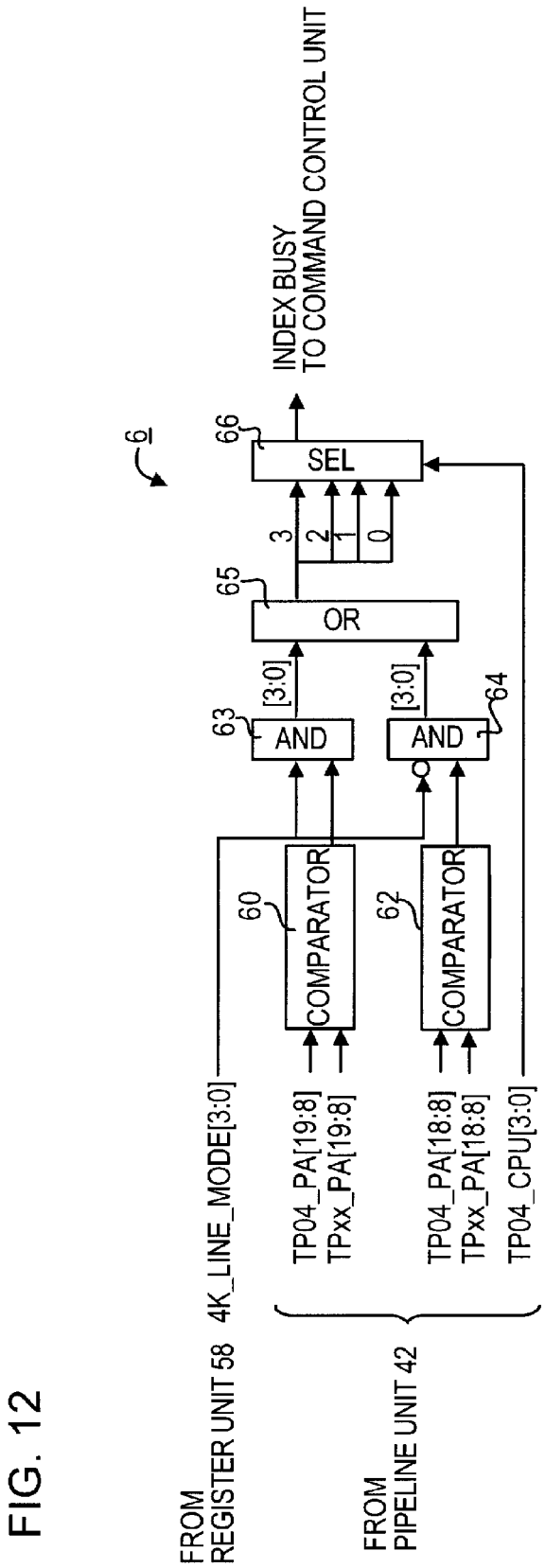
FIG. 12 is a block diagram of an address contention checking unit in a busy control unit in FIG. 10.

Next, the address contention check unit 6 in the busy control unit 56 and the address contention check unit 7 in the address lock register unit 54 will be explained. FIG. 12 is a block diagram of the address contention check unit in the busy control unit 56.

The address contention check unit 6 checks the address contention of the index in the pipeline 42. The address contention check unit 6 targets all address which match the index as check and performs the address check for the address there is a possibility of update in a period prior to the determination of the address of the update destination in the cache tag memory 20-0~20-3. Thereby, it is prevented that the subsequent request accesses to the address, which may be updated thereafter, in the cache tag memory 20-0~20-3.

As depicted in FIG. 12, the address contention check unit 6 includes two comparison circuits 60 and 62, two AND circuits 63 and 64, one OR circuit 65 (OR), and a selection circuit 66. A first comparison circuit 60 compares TP04_index PA [19:8] (that is, a second busy range), of which the FF circuit 50-4 (timing TP4) holds, with TPxx_index PA [19:8], of which the FF circuits 50-5~50-n-1 connected to later stage of the FF circuit 50-4, hold.

A second comparison circuit 62 compares TP04_index PA [18:8] (that is, a first busy range), of which the FF circuit 50-4 (timing TP04) holds, with TPxx_index PA [18:8], of which the FF circuits 50-5~50-n-1 connected to later stage of the FF circuit 50-4, hold. In other words, the check timing is TP04 and the check targets are requests that are present in subsequent stages of the TP 04 (the FF circuit 50-4).

The first AND circuit 63 calculates AND (logical product) of 4K_LINE_MODE signal of 4 bits (the setting value of busy range) as depicted in FIG. 11 and the comparison result (match/mismatch) of the comparison circuit 60. The second AND circuit 64 calculates AND (logical product) of an inverted signal of 4K_LINE_MODE signal of 4 bits (the setting value of busy range) as depicted in FIG. 11 and the comparison result (match/mismatch) of the comparison circuit 62.

The OR circuit 65 calculates logical sum of the results of the operation of both of the AND circuits 63 and 64. The selection circuit 66 selects one of the 4-bit arithmetic result of the OR circuit 65 according to the CPU number TP04_CPU [3:0] from the FF circuit 50-4.

That is, the first comparison circuit 60 checks for contentions in the second busy range and the second comparison circuit 62 checks for contentions in the first busy range. And the first AND circuit 63 takes out the contention result of the second busy range and the second AND circuit 64 takes out the contention result of the first busy range. The selection circuit 66 selects the contention result of the CPU corresponding to the request from the contention results of the first busy range and the second busy range through the OR circuit 65.

The selection circuit 66 outputs an index busy signal to the command control unit 40 through the signal line S8 in FIG. 10. For example, the index busy is indicated when the index busy signal is "1", and not index busy is indicated when the index busy signal is "0". When it is determined that there is a subsequent request of which the address contentions to the address of the precedent request in the pipeline unit 42 by a result of the address contention check of the busy control unit 56 (when the index busy), the busy control unit 56 requests re-enter of the request to the command control unit 40.

In this way, the address contention check unit 6 checks the address contention with the preceding request in the pipeline unit 42 and controls the command control unit 40.

Figure 13:
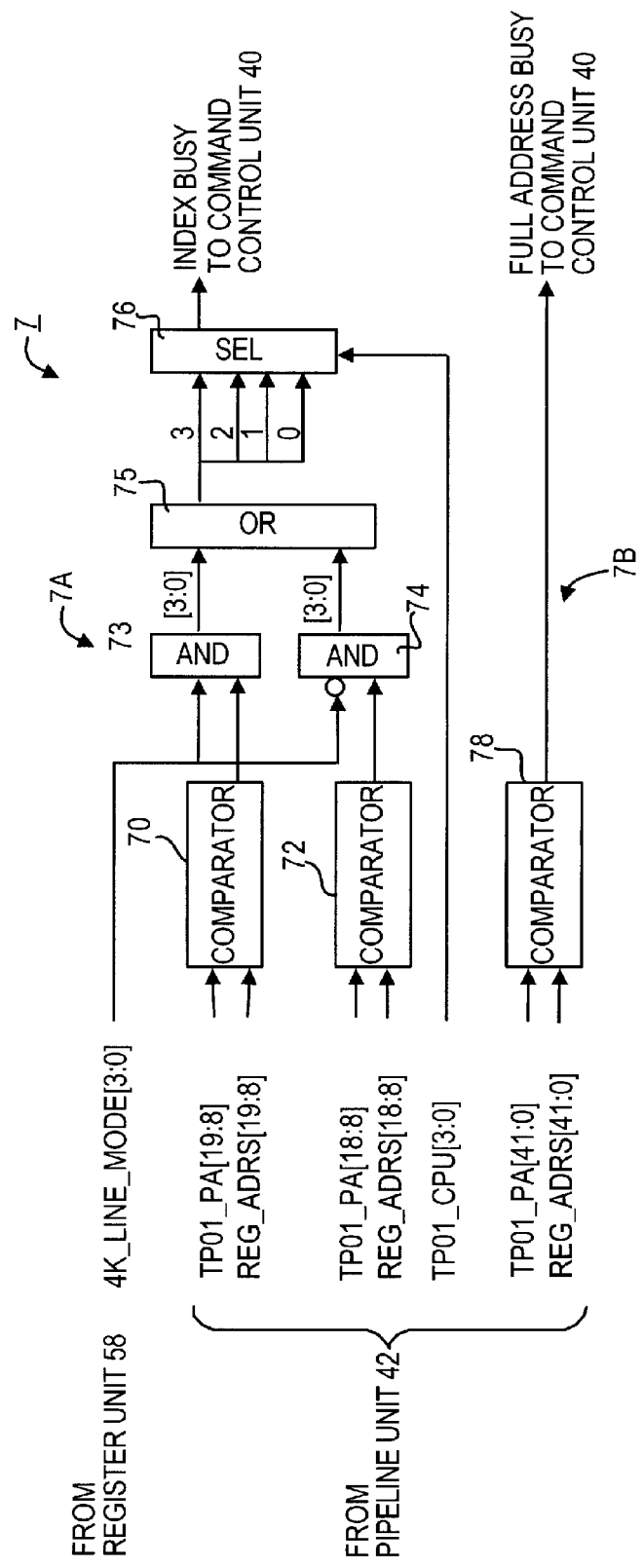
FIG. 13 is a block diagram of an address contention checking unit in an address lock register unit in FIG. 10.

FIG. 13 is a block diagram of the address contention check unit 7 in the address lock register unit 54. As depicted in FIG. 13, the address contention check unit 7 includes an index contention check unit 7A and a full address contention check unit 7B.

The index contention check unit 7A determines that the request which is set to the address lock register 516 is a target of the check in a check timing TP01, and performs the contention check for the address of the request source, from the determination of the address in the update destination in the address cache management information (TAG) until completion of processing of the CPU. The address of the storing destination is specified by the index, when the data requested by another CPU is transferred to the CPU itself and is stored in the cache memory of the own CPU. Therefore, it is possible to prevent that the subsequent request accesses the address which is stored the requested data.

The index contention check unit 7A includes two comparison circuits 70 and 72, two AND circuits 73 and 74, one OR circuit 75 and a selection circuit 76.

The first comparison circuit 70 compares TP01_index PA [19:8] (a second busy range), in which the FF circuit 50-1 (timing TP01) holds, with REG_ADRS [19:8] in which the address lock register 516 holds. The second comparison circuit 72 compares TP01_index PA [18:8] (a first busy range), in which the FF circuit 50-1 (timing TP01) holds, with REG_ADRS [18:8] in which the address lock register 516 holds.

In other words, the check timing is TP01, and the check target is a request after timing TP01 (the FF circuit 50-1).

The first AND circuit 73 calculates AND (logical product) of 4K_LINE_MODE signal of 4 bits (the setting value of the busy range) as depicted in FIG. 11 with the comparison result (match/mismatch) of the comparison circuit 70. The second AND circuit 74 calculates AND (logical product) of an inverted signal of the 4K_LINE_MODE signal of 4 bits (the setting value of the busy range) as depicted in FIG. 11 and the comparison result (match/mismatch) of the comparison circuit 72.

The OR circuit 75 calculates logical sum of the results of the operation of both of the AND circuits 73 and 74. The selection circuit 76 selects one of the 4-bit arithmetic result of the OR circuit 75 according to the CPU number TP04_CPU [3:0] from the FF circuit 50-1.

That is, the first comparison circuit 70 checks for contentions in the second busy range and the second comparison circuit 72 checks for contentions in the first busy range. And the first AND circuit 73 takes out the contention result of the second busy range and the second AND circuit 74 takes out the contention result of the first busy range. The selection circuit 76 selects the contention result of the CPU corresponding to the request from the contention results of the first busy range and the second busy range through the OR circuit 75.

The selection circuit 76 outputs an index busy signal to the command control unit 40 through the signal line S6 in FIG. 10. For example, the index busy is indicated when the index busy signal is "1", and not index busy is indicated when the index busy signal is "0". When it is determined that there is a subsequent request of which the address contentions to the address of the precedent request in the pipeline unit 42 by a result of the address contention check of the address lock register unit 54 (when the index busy), the address lock register unit 54 requests re-enter of the request to the command control unit 40.

Next, the full address contention check unit 7B checks the address contention of the subsequent request and the address in the address lock register 516. The full address contention check unit 7B performs the address check for the address there is a possibility of update in a period from the determination of the address of the update destination in the cache management information (TAG) tag memory 20-0~20-3 until the completion of the processing of the CPU. Because the address of the update destination is specified and the address is stored in the address lock register, it is prevented that the subsequent request accesses to the address, which is processing in the cache tag memory 20-0~20-3.

The full address contention check unit 7B includes a comparison circuit 78 that compares the full address TP01_PA [41:0] of which the FF circuit 50-1 (timing TP01) holds with the full address REG_ADRS [41:0] of which the address lock register 516 holds.

The comparison circuit 78 outputs a full address busy signal to the command control unit 40 through the signal line S6 in FIG. 10. When it is determined that there is a subsequent request of which the address contentions to the address of the precedent request in the pipeline unit 42 by a result of the full address contention check of the address lock register unit 54 (when the full address busy), the address lock register unit 54 requests re-enter of the request to the command control unit 40.

In this way, the contention check is performed between the request address which is set in the address lock register 516 and the subsequent requests.

(Cache Synchronous Processing)

Figure 14:
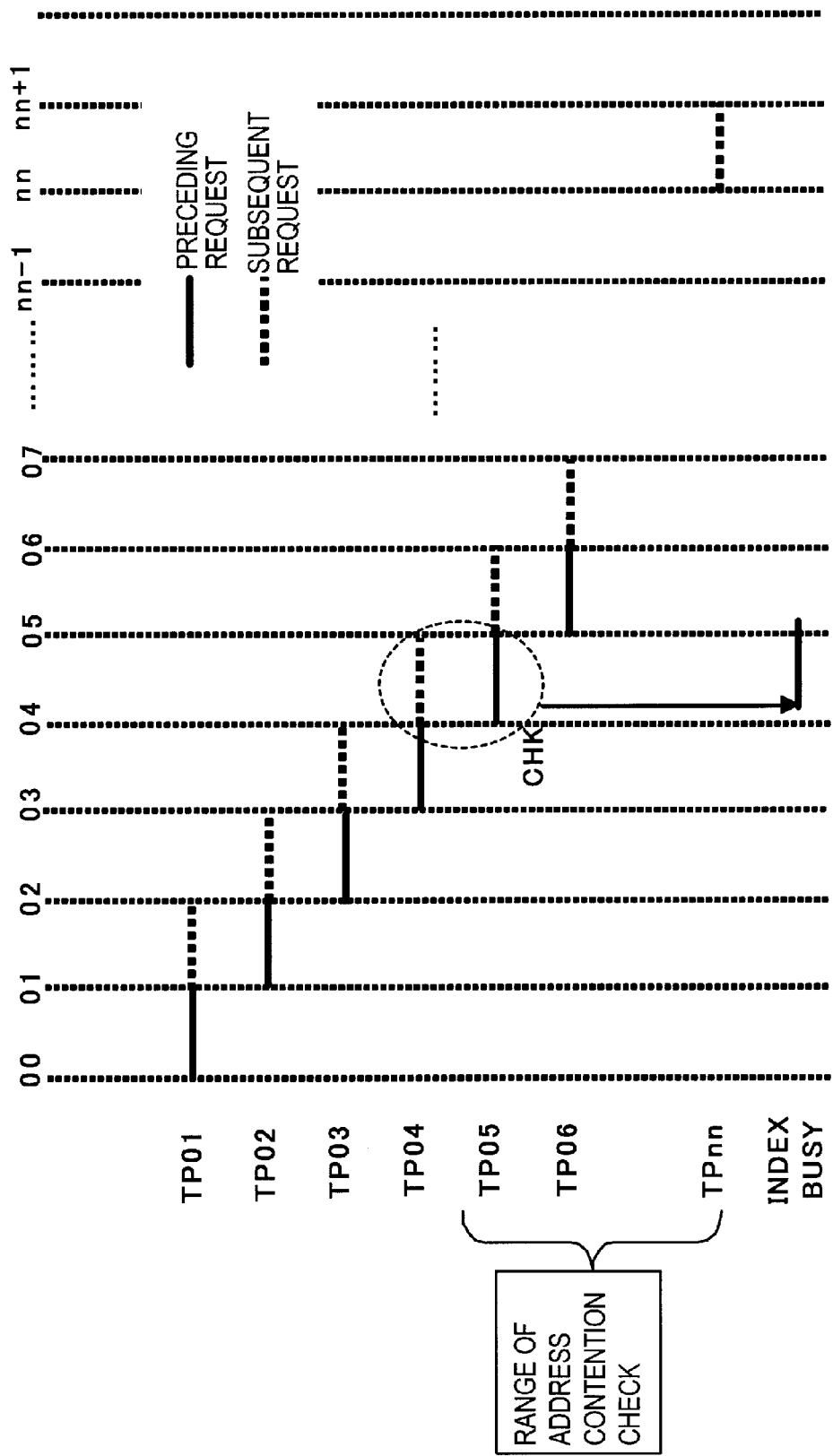
FIG. 14 is an explanatory diagram of an operation of the address contention check in the busy control unit in FIG. 10 and FIG. 12.
Figure 15:
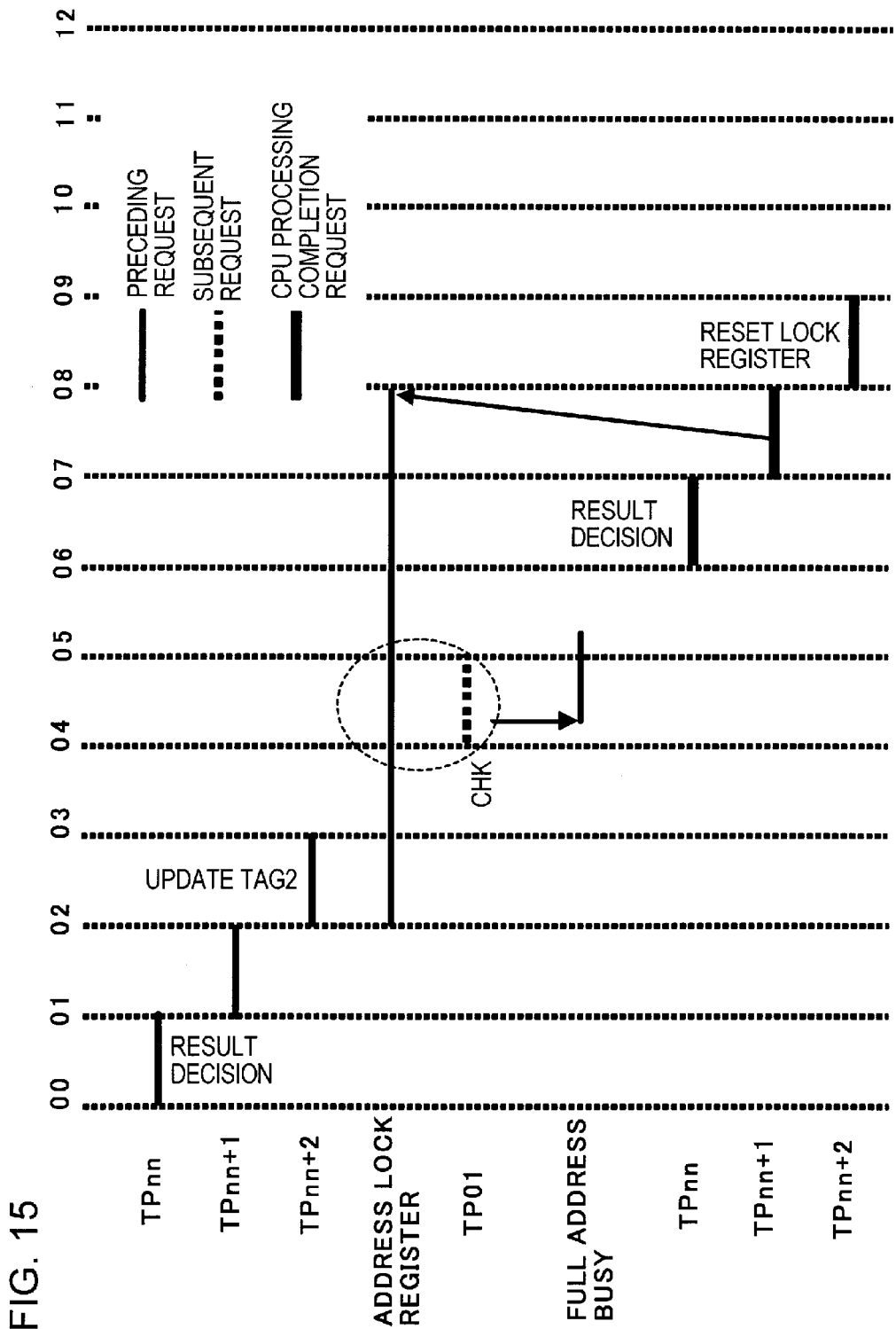
FIG. 15 is an explanatory diagram of an operation of the address contention check in the address lock register unit in FIG. 10 and FIG. 13.

FIG. 14 is a diagram for explaining the operation of the address contention check in the busy control unit 56 described in FIG. 10 and FIG. 12. FIG. 15 is a diagram for explaining the operation of the address contention check in the address lock address register unit 54 as described in FIG. 10 and FIG. 13. In FIG. 14 and FIG. 15, a horizontal axis indicates a time and a vertical axis indicates operations of the registers to be checked and the FF circuit (indicated by "TP01"~"TPnn" in the Figures).

The operation of the configuration of FIG. 10 to FIG. 13 will be described below with reference to FIG. 14 and FIG. 15. First, the MMB 2 sets the busy mode of each CPUs to the busy setting registers 22-0 to 22-3 in the register unit 58 (referring to FIG. 11). As described in FIG. 11, the 4K_LINE_MODE is set to "0" in 2K_LINE BUSY mode, and the 4K_LINE BUSY mode is set to "1" in 4K_LINE BUSY mode.

The command control unit 40 enters the request received from the CPU 10-0~10-3 into the pipeline unit 42. The requests that have been entered, is also inputted to the cache tag memory control unit 21-0~21-3 and the address lock register unit 54. The requests in the pipeline unit 42 reach to the result decision unit 52. And the request includes VAL bit (Valid signal indicating the effectiveness request). a 39-bit physical address of the request PA [41:3] and a 4-bit CPU number of request source. The index is defined 12-bit [19:08] which is one part of the physical address.

The address contention check unit 6 in the busy control unit 56 performs the address contention check between one request and a preceding request which precedes the one request in the pipeline unit 42. In this case, as described above, the busy check is performed by changing the busy range for each cache tag memory capacity (CPU).

When it is determined that there is a address contention with the preceding request in the pipeline unit 42 by a result of the address contention check in the busy control unit 56, the busy control unit 56 requests re-enter of the request to the command control unit 40. And, when it is determined that there is not the address contention of the request and the result decision unit 53 determines that update of the TAG (cache management information) is necessary, the busy control unit 56 updates the TAG and sets the full address of the processing target request to the lock register 516.

The operation will be explained by the timing chart of the index address contention check in the pipeline unit 42 of FIG. 14. In FIG. 14, the solid line indicates the preceding request and the dotted line indicates the subsequent request. FIG. 14 illustrates an example of the address contention when reaching the subsequent request (dotted line) in TP 04 (FF 50-4) in a state that the preceding request (solid line) is present later TP 05 (FF 50-5). In other words, the example depicts that the indexes of the both of the preceding request and the subsequent request are matched.

Because the index of the subsequent request (dotted line) matches to the index of the preceding request (solid line), the index address contention check of the pipeline in the contention check unit 6 determines index busy (depicted by "CHK" in the dotted circle in FIG. 14). The subsequent request (dotted line) is retry processed by the command control unit 40 after determination of the index busy.

Further, the subsequent request which has been determined the index busy is erased in the pipeline unit 42. Or, the subsequent request is added to a flag indicating the busy and is transferred to the result decision unit 52, and the result decision unit 52 erases the subsequent request.

Next, the address contention check in the address lock register unit 54 will be explained. FIG. 15 is a timing chart of contention check of the full address/index in the address lock register 54. In FIG. 15, a solid line indicates the preceding request, a dotted line indicates the subsequent request and a thick line indicates the completion request of CPU processing.

The preceding request (the solid line) is determined the result of the contention (here, the determination of no contention) at TPnn stage and the update address of the cache tag information TAG is determined. Then, the TAG in the cache tag memory is updated and the updated address is set to the address lock register unit 54 by the preceding request at time TPnn+2. And updating the TAG and the set of updated address to the address lock register 54 are performed to extract the required information from the information contained in the preceding request packet.

Then, when the subsequent request has reached the stage TP01, the contention check unit 7 in the above-mentioned address lock register unit 54 is performed the full address contention. At this time, when the address which is stored in the address lock register 516 match to the full address of the subsequent request, the contention check unit 7 determines to the full address busy. After this, the subsequent request is retry processed by the command control unit 40.

Similarly, the contention check unit 7 performs the index contention check between the request in the address lock register 516 and the subsequent request at the stage TP01. The contention check unit 7, when the index is matched, determines that the index busy, and performs retry process of the subsequent request.

In addition, which the contention check unit 7 use the index or the full address to perform the contention check depend on the command of the request. In other words, even one of the index and the full address may be used, or both of the index and the full address may be used to the contention check.

Thereafter, when the processing of the CPU of the request source is completed and the request of the completion notification of the CPU processing has been entered into the pipeline unit 52, the result decision unit 52 determines the request as a reset of the address lock register, and the address lock register 516 is reset by the result of the determination at the stage TPnn+2.

(Dynamic Cache Synchronization Process)

Figure 16:
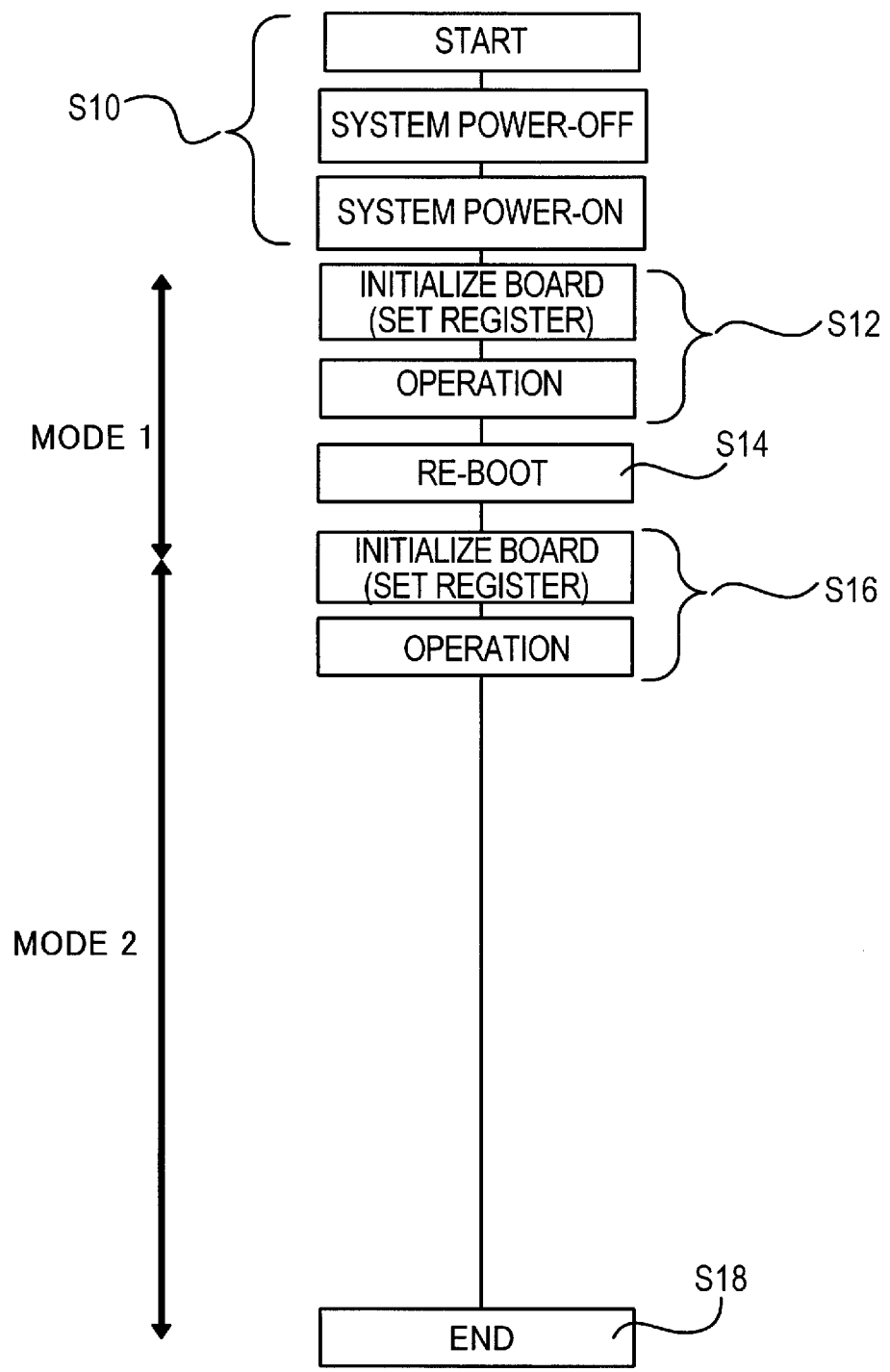
FIG. 16 is a flow diagram of a cache synchronization process according to the embodiment.

FIG. 16 is a flow diagram of a cache synchronization process according to the embodiment.

(S10) A firmware program installed in the MMB 2, when receiving the start instruction of the information processing system, turns off the power of the system, then turns on the power of the system.

(S12) The firmware program in the MMB2 performs processing of initialization of the system board 1A (1B~1P) after power-on. In the initialization process, the firmware program in the MMB 2 obtains specification information for the CPU 10-0~10-3, which are mounted on the system board 1A (1B~1P), and sets the busy range values in the busy range setting registers 22-0~22-3 in the system controller 12 based on the specification information. Then, the firmware program in the MMB2 allows the operation of the system board 1A (1B~1P) (as depicted as mode 1 in FIG. 16).

(S14) A reboot has occurred for some reason during this operation.

(S16) When even the reboot has occurred, the firmware program of the MMB2 performs an initialization process after a reboot of the system board 1A (1B~1P). In the initialization process, the firmware program in the MMB 2 obtains specification information for the CPU 10-0~10-3, which are mounted on the system board 1A (1B~1P), and sets the busy range values in the busy range setting registers 22-0~22-3 in the system controller 12 based on the specification information. Then, the firmware program in the MMB2 allows the operation of the system board 1A (1B~1P) (as depicted as mode 2 in FIG. 16).

(S18) When the operation is end, the operation of the system is finished.

In this way, it is possible that the firmware program of the MMB 2 sets and changes the busy range value in the busy range setting registers during the initialization process of the system board after power on and according to the reboot.

Next, dynamic setting process of the busy range according to another embodiment will be described.

In the process of setting in FIG. 16, it is not possible to change the busy range values in the busy range setting registers 22-0~22-3 unless the reboot occurs. In other words, during operating of the system, the busy range values are not changed until the next setting change.

On the other hand, in an active maintenance, etc., there is a case that new system board and/or new CPU chip in the exist system board are added and connected to the information processing system during the operating of the system. Also, there is a case to replace a failed system board and failed CPU chip to new system board and new CPU chip. According to dynamic change of configuration, it is necessary to change the settings of the busy range values during the system operation.

As described in FIG. 10, in order to change the busy monitoring range in response to dynamic reconfiguration (called to "DR"), the busy control unit 56 confirms that following conditions (1) and (2) are established, then notifies a changeable notification of the busy range setting to the register unit 58 via the signal line S9.

(1) Commands in the address lock register unit 54 are all processed.

(2) Commands in the pipeline unit 42 has been completed. In other words, there is no command in the stages TP00~TP03 (the FF circuits 50-0~50-3) which will access the lock register unit 58 in the future and there is no command to all stages.

The busy setting changing unit 23 in the register unit 58, after receiving the changeable notification of the busy range setting from the busy control unit 56, performs the request of change of the busy range setting from the MMB 2 to the busy setting registers 22-0~22-3. In other words, the busy setting changing unit 23 performs change of setting of the busy monitoring range in a state that there is not a command during the processing in the address lock register unit 54.

Figure 17:
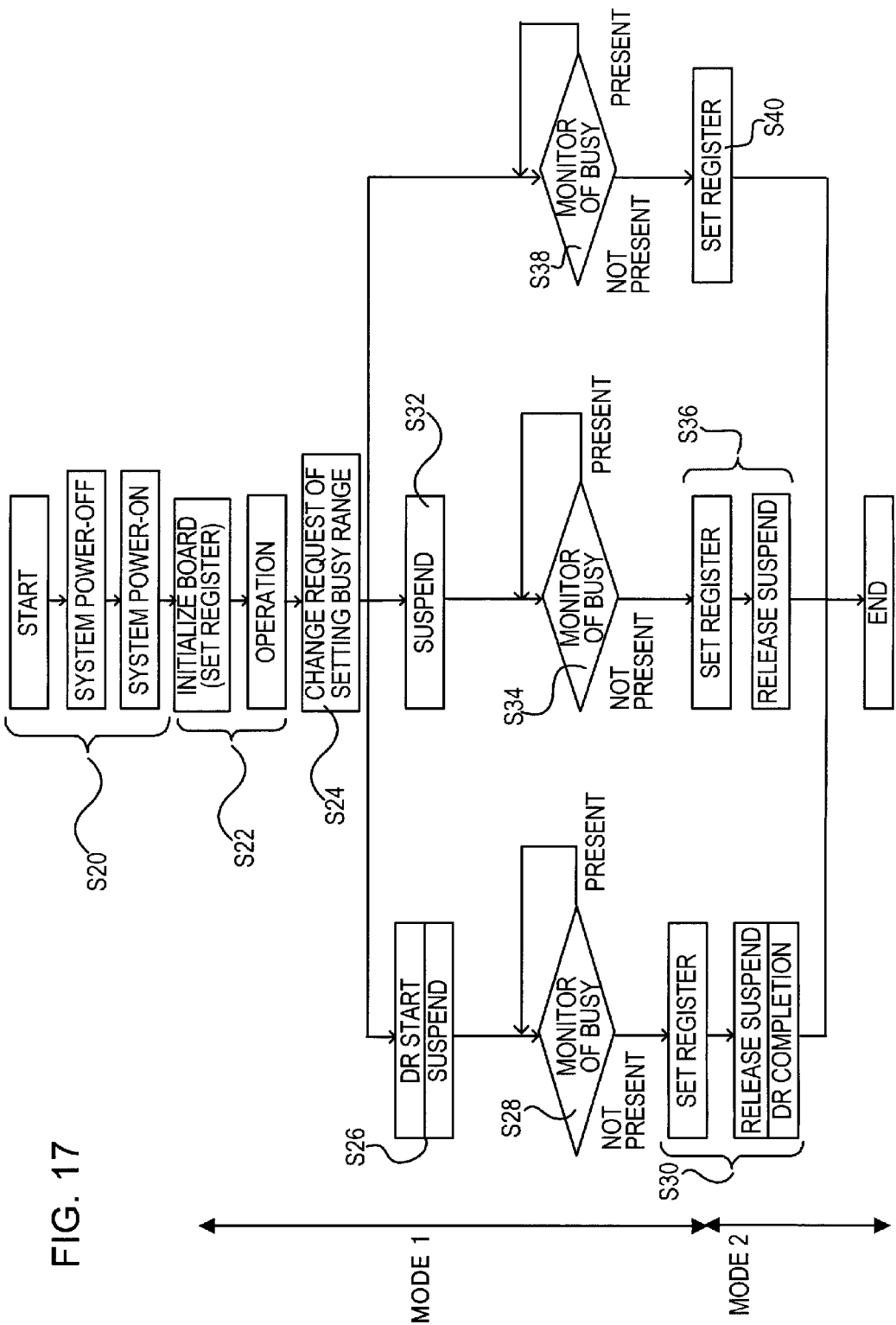
FIG. 17 is a flow diagram of dynamic cache synchronization process according to another embodiment.

FIG. 17 is a flow diagram of setting change processing of the busy range according to another embodiment.

(S20) The firmware program installed in the MMB 2, when receiving the start instruction of the information processing system, once turns off the power of the system and then turns on the power of the system.

(S22) The firmware program in the MMB 2 performs processing of initialization the system board 1A (1B~1P) after power on. In the initialization process, the firmware program in the MMB 2 obtains specification information for the CPU 10-0~10-3, which are mounted on the system board 1A (1B~1P), and sets the busy range values in the busy range setting registers 22-0~22-3 in the system controller 12 based on the specification information. Then, the firmware program in the MMB2 allows the operation of the system board 1A (1B~1P).

(S24) The MMB 2 receives the request of the setting change of the busy range during the operation.

(S26) When the request of change is the dynamic configuration change, the firmware program in the MMB 2 modifies the dynamic configuration. The busy control unit 56 in the system controller 12 outputs the stop request of entering the command to the pipeline unit 42 to the command control unit 40. Thereby, the system becomes a suspend state.

(S28) In the meantime, the busy control unit 56 in the system controller 12 monitors the presence or absence of a command being processed in the address lock register unit 54 via the signal line S7.

(S30) The busy control unit 56 confirms that the commands being processed are now processed all and that there is no command in the stages TP00~TP03 in the pipeline unit 42 and then notifies the changeable notification of the busy range setting to the register unit 58. The busy setting changing unit 23 in the register unit 58 performs the change request of the busy range setting from the MMB 2 to the busy setting registers 22-0~22-3.

The busy setting changing unit 23 notifies the setting value of the busy range to the busy control unit 56 and the address lock register unit 54 and the setting value of the busy range that has been set is used for a busy decision logic. The busy control unit 56, after changing the busy range setting, performs control to resume the entering of the command to the pipeline unit 42 for the command control unit 40 and becomes a state of release of the suspend. Then, according to the completion of dynamic reconfiguration processing of the firmware program in the MMB 2, the suspend state is released, and the dynamic configuration change process is terminated.

That is, it is possible to change the busy range values which are set in the initialization process of the system board 1A (in the mode 1) to different setting values (mode 2) during the operation of the system.

(S32) When dynamic configuration change processing is not performed by the firmware in the MMB 2, the busy control unit 56 of the system controller 12 outputs the stop request of entering of the command to the pipeline unit 42 to the command control unit 40. Thereby, the system 1 becomes suspend state.

(S34) In the meantime, the busy control unit 56 in the system controller 12 monitors the presence or absence of a command being processed in the address lock register unit 54 via the signal line S7.

(S36) The busy control unit 56 confirms that the commands being processed are now processed all and that there is no command in the stages TP00~TP03 in the pipeline unit 42 and then notifies the changeable notification of the busy range setting to the register unit 58. The busy setting changing unit 23 in the register unit 58 performs the change request of the busy range setting from the MMB 2 to the busy setting registers 22-0~22-3.

The busy setting changing unit 23 notifies the setting value of the busy range to the busy control unit 56 and the address lock register unit 54 and the setting value of the busy range that has been set is used for a busy decision logic. The busy control unit 56, after changing the busy range setting, performs control to resume the entering of the command to the pipeline unit 42 for the command control unit 40 and becomes a state of release of the suspend.

That is, it is possible to change the busy range values which are set in the initialization process of the system board 1A (mode 1) to different setting values during the operation of the system (mode 2).

(S38) When the dynamic reconfiguration change process is not performed and the suspend is not performed by the firmware in the MMB 2, the busy control unit 56 of the system controller 12 monitors the presence or absence of the command being processed in the address lock register unit 54.

(S40) The busy control unit 56 confirms that the commands being processed are now processed all and that there is no command in the stages TP00~TP03 in the pipeline unit 42 and then notifies the changeable notification of the busy range setting to the register unit 58. The busy setting changing unit 23 in the register unit 58 performs the change request of the busy range setting from the MMB 2 to the busy setting registers 22-0~22-3.

The busy setting changing unit 23 notifies the setting value of the busy range to the busy control unit 56 and the address lock register unit 54 and the setting value of the busy range that has been set is used for a busy decision logic.

In this way, in the busy monitoring, when satisfying the condition of no command which is managed by the index being processed in the system controller 12, it may be performed to change the setting value in the registers 22-0~22-3.

Other Embodiments

In the above embodiments, a combination of even and double capacities of the cache memories are depicted by an example, it is applied to a mixed configuration of the CPUs that have one times capacity and n (n>2) times capacity of cache memories. In that case, because the occurrence rate of the busy falls to 1/n times, it is possible to further improve the throughput.

The system controller has been described to the system board which mounts a plurality of CPU chips in the example, but the system controller may be applied to mount a controller board which is connected to the plurality of system boards.

The foregoing has described the embodiments of the present invention, but within the scope of the spirit of the present invention, the present invention is able to various modifications, and it is not intended to exclude them from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. Information processing system comprising:
a first CPU unit having a first CPU and a first cache memory that stores cache tag information and cache data;
a second CPU unit having a second CPU and a second cache memory that stores cache tag information and cache data and has a different capacity from a capacity of the first cache memory; and
a system controller that is connected to the first CPU unit and the second CPU unit and searches a third cache memory that stores a copy of the cache tag information in the first cache memory and a fourth cache memory that stores a copy of the cache tag information in the second cache memory according to a request to the first cache memory and the second cache memory from the first CPU unit and the second CPU unit,
wherein the system controller comprising:
a cache synchronization unit that monitors whether or not preceding request and subsequent request require same cache address by monitoring range of busy that is set and make a retry of the subsequent request that requires the same cache address as the preceding request to a CPU that has required when receiving the subsequent request before completing update of the copy of the cache tag information by the preceding request; and
a setting unit that sets different monitoring ranges of the busy between the third cache tag memory and the fourth cache tag memory to the cache synchronization unit.

2. The information processing system according to claim 1, wherein the system controller further comprises a pipeline unit that holds a plurality of requests inputted from the first CPU and the second CPU in order of the input,
and wherein the cache synchronization unit monitors whether or not the preceding request and the subsequent request in the pipeline unit require same cache address by the monitoring range of busy which is set.

3. The information processing system according to claim 1, wherein the cache synchronization unit compares one portion of physical address in the preceding request with one portion of physical address in the subsequent request in the monitoring range of the busy to monitor whether or not the preceding request and the subsequent request require same cache address.

4. The information processing system according to claim 1, wherein the cache synchronization unit compares one portion of physical address in the preceding request with one portion of physical address in the subsequent request in a first monitoring range of the busy and compares another one portion of the physical address in the preceding request with another one portion of the physical address in the subsequent request in a second monitoring range of the busy.

5. The information processing system according to claim 1, wherein the information processing system further comprises a system management device that monitors status of the first CPU unit, the second CPU unit and the system controller and sets the monitoring range of busy to the setting unit in the system controller.

6. The information processing system according to claim 1, wherein the information processing further comprises a system management device that monitors status of the first CPU unit, the second CPU unit and the system controller, receives a change request of the monitoring range of busy and sets the monitoring range of busy to the setting unit in the system controller after the cache synchronization unit detects that the request is not present in the system controller.

7. The information processing system according to claim 2, wherein the cache synchronization unit further comprises a lock register unit that holds a physical address of the request until a completion of processing of the request by the CPU unit.

8. The information processing system according to claim 2, wherein the system controller further comprises a command control unit that accepts the requests from the first CPU unit and the second CPU unit, enters accepted request to the pipeline unit, and sends a retry request to the CPU of request source according to a reception of a result of the monitor from the cache synchronization unit.

9. The information processing system according to claim 7, wherein the cache synchronization unit comprises:
a first monitoring unit that monitors whether or not the preceding request and the subsequent request that are held in the pipeline unit require same cache address by the monitoring range of busy; and
a second monitoring unit that monitors whether or not the preceding request held in the lock register unit and the subsequent request held in the pipeline unit require same cache address by the monitoring range of busy.

10. A system controller that is connected to a first CPU unit having a first CPU and a first cache memory that stores cache tag information and cache data and a second CPU unit having a second CPU and a second cache memory that stores cache tag information and cache data and has a different capacity from the capacity of the first cache memory, the system controller comprises:
- a cache tag search unit that searches a third cache memory that stores a copy of the cache tag information in the first cache memory and a fourth cache memory that stores a copy of the cache tag information in the second cache memory according to a request to the first cache memory and the second cache memory from the first CPU unit and the second CPU unit;
- a cache synchronization unit that monitors whether or not preceding request and subsequent request require same cache address by monitoring range of busy that is set and make a retry of the subsequent request that requires the same cache address as the preceding request to a CPU that has required when receiving the subsequent request before completing update of the copy of the cache tag information by the preceding request; and
- a setting unit that sets different monitoring ranges of the busy between the third cache tag memory and the fourth cache tag memory to the cache synchronization unit.

11. The system controller according to claim 10, wherein the system controller further comprises a pipeline unit that holds a plurality of requests inputted from the first CPU and the second CPU in order of the input,
and wherein the cache synchronization unit monitors whether or not the preceding request and the subsequent request in the pipeline unit require same cache address by the monitoring range of busy which is set.

12. The system controller according to claim 10, wherein the cache synchronization unit compares one portion of physical address in the preceding request with one portion of physical address in the subsequent request in the monitoring range of the busy to monitor whether or not the preceding request and the subsequent request require same cache address.

13. The system controller according to claim 10, wherein the cache synchronization unit compares one portion of physical address in the preceding request with one portion of physical address in the subsequent request in a first monitoring range of the busy and compares another one portion of the physical address in the preceding request with another one portion of the physical address in the subsequent request in a second monitoring range of the busy.

14. The system controller according to claim 10, wherein the setting unit sets the monitoring range of busy from a system management device that monitors status of the first CPU unit, the second CPU unit and the system controller.

15. The system controller according to claim 10, wherein the setting unit sets the monitoring range of busy from a system management device that monitors status of the first CPU unit, the second CPU unit and the system controller after the cache synchronization unit detects that the request is not present in the system controller.

16. The system controller according to claim 11, wherein the cache synchronization unit further comprises a lock register unit that holds a physical address of the request until a completion of processing of the request by the CPU unit.

17. The system controller according to claim 11, wherein the system controller further comprises a command control unit that accepts the requests from the first CPU and the second CPU, enters accepted request to the pipeline unit, and sends a retry request to the CPU of request source according to a reception of a result of the monitor from the cache synchronization unit.

18. The system controller according to claim 16, wherein the cache synchronization unit comprises:
- a first monitoring unit that monitors whether or not the preceding request and the subsequent request that are held in the pipeline unit require same cache address by the monitoring range of busy; and
- a second monitoring unit that monitors whether or not the preceding request held in the lock register unit and the subsequent request held in the pipeline unit require same cache address by the monitoring range of busy.

* * * * *